United States Patent
Nomura et al.

(10) Patent No.: US 11,977,487 B2
(45) Date of Patent: May 7, 2024

(54) DATA CONTROL DEVICE, STORAGE SYSTEM, AND DATA CONTROL METHOD

(71) Applicant: Hitachi, Ltd., Tokyo (JP)

(72) Inventors: Shimpei Nomura, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/902,078

(22) Filed: Sep. 2, 2022

(65) Prior Publication Data

US 2023/0146399 A1 May 11, 2023

(30) Foreign Application Priority Data

Nov. 8, 2021 (JP) .................................. 2021-181770

(51) Int. Cl.
*G06F 12/08* (2016.01)
*G06F 12/0842* (2016.01)

(52) U.S. Cl.
CPC .. *G06F 12/0842* (2013.01); *G06F 2212/6042* (2013.01)

(58) Field of Classification Search
CPC .. G06F 12/08; G06F 12/0642; G06F 12/0284; G06F 12/02; G06F 2212/6042; G06F 2212/7202
See application file for complete search history.

(56) References Cited

U.S. PATENT DOCUMENTS

| | | | |
|---|---|---|---|
| 2003/0149614 A1* | 8/2003 | Andrus | G06Q 10/10 705/1.1 |
| 2009/0125634 A1 | 5/2009 | Virdi et al. | |
| 2012/0290789 A1* | 11/2012 | Susarla | G06F 16/172 711/E12.017 |
| 2014/0067988 A1* | 3/2014 | Noronha | H04L 67/568 709/213 |
| 2016/0085446 A1* | 3/2016 | Kumabe | G06F 3/0649 711/146 |
| 2016/0224273 A1* | 8/2016 | Shinozaki | G06F 3/0689 |
| 2017/0269875 A1* | 9/2017 | Kim | G06F 12/0653 |
| 2020/0201773 A1* | 6/2020 | Alagumuthu | G06F 12/0871 |
| 2020/0244527 A1* | 7/2020 | Sharma | H04L 41/0816 |
| 2020/0336940 A1* | 10/2020 | Salkintzis | H04W 28/085 |
| 2021/0193244 A1* | 6/2021 | Sity | G11C 29/006 |

OTHER PUBLICATIONS

Daniel A. Reed, "Learning to Classify Parallel I/O Access Patterns," in Scalable Input/Output: Achieving System Balance, MIT Press, 2003, pp. 201-231.*

* cited by examiner

*Primary Examiner* — Pierre Michel Bataille
(74) *Attorney, Agent, or Firm* — MATTINGLY & MALUR, PC

(57) ABSTRACT

In a management node that manages a distributed file and object storage that accessibly manages a file used by an application, the distributed file and object storage is accessible to a file managed by a storage of another site, and a management node includes a processor, and the processor is configured to specify an access circumstance relating to a file by an application, and control caching by the distributed file and object storage of the own site with respect to the file managed by the storage of the other site used by the application, before the application is executed, based on the access circumstance.

11 Claims, 26 Drawing Sheets

FIG. 5

MANAGEMENT INFORMATION FILE 600

USER FILE MANAGEMENT INFORMATION 610

| UUID 611 | VERSION 612 | VIRTUAL PATH 613 | FILE STATE 614 | REFERENCE DESTINATION SITE 615 | REFERENCE SOURCE SITE 616 | REPLICATION DESTINATION SITE 617 | REPLICATION SOURCE SITE 618 | METADATA REGISTERED FLAG 619 |
|---|---|---|---|---|---|---|---|---|
| AAAA | 2 | /Dir1/File1 | Original | – | – | SITE 3 | – | True |

PART MANAGEMENT INFORMATION 650

| OFFSET 651 | SIZE 652 | PART STATE 653 |
|---|---|---|
| 0 | 128 | Cache |
| 128 | 256 | Dirty |

FIG. 6

METADATA DB 700

| UUID 701 | VERSION 702 | VIRTUAL PATH 703 | FILE STATE 704 | FILE TYPE 705 | KEYWORD 706 |
|---|---|---|---|---|---|
| AAAA | 2 | /Dir1/File1 | Original | DOCUMENT | EDUCATION, CULTURE |
|  | 1 | /Dir1/File1 | Original | DOCUMENT | EDUCATION, CULTURE |
| BBBB | 1 | /Dir2/File2 | Stub | DOCUMENT | COOKING |
| CCCC | 1 | /Dir3/File3 | Replica | DOCUMENT | MEDICAL CARE |
| ... | | | | | |

FIG. 7

OPERATION LOG 800

| APP ID 801 | CONTAINER ID 802 | OPERATION 811 | UUID 812 | VERSION 813 | PATH 814 | TYPE 815 | OFFSET 816 | SIZE 817 | TIME STAMP 818 |
|---|---|---|---|---|---|---|---|---|---|
| A1 | C1 | Read | aaaa | 2 | /Dir1/File1 | FILE | 0 | 4096 | T1 |
| | | Read | aaaa | 2 | /Dir1/File1 | FILE | 4096 | 8192 | T2 |
| | | Create | iiii | 1 | /Dir1/File9 | FILE | 0 | 128 | T3 |
| | | Write | iiii | 2 | /Dir1/File9 | FILE | 128 | 128 | T4 |
| | | Read | aaaa | 2 | /Dir1/File1 | FILE | 12288 | 4096 | T5 |
| | | Read | aaaa | 2 | /Dir1/File1 | FILE | 16384 | 2048 | T6 |
| | | ⋮ | | | | | | | |

FIG. 8

SITE-TO-SITE NETWORK BANDWIDTH
MANAGEMENT TABLE 900

| NETWORK BANDWIDTH [MB/s] | SITE 1 | SITE 2 | SITE 3 |
|---|---|---|---|
| SITE 1 | – | 100 | 200 |
| SITE 2 | 100 | – | 50 |
| SITE 3 | 200 | 50 | – |

FIG. 9

APPLICATION MODEL MANAGEMENT TABLE 1000

| APPLICATION 1001 | PERFORMANCE MODEL INFORMATION 1010 | | ACCESS PATTERN MODEL INFORMATION 1020 | ALLOWABLE READ LATENCY 1002 |
|---|---|---|---|---|
| | IO OPERATION 1011 | PERFORMANCE MODEL FORMULA 1012 | ACCESS PATTERN MODEL STORAGE PATH 1021 | |
| APPLICATION A | Sequential Read [MB/s] | y=g1(x) | /xxx/aaa | xx ms |
| | Random Write [MB/s] | y=g3(x) | | |
| APPLICATION B | Random Read [MB/s] | y=g5(x) | /xxx/bbb | xx ms |

PERFORMANCE MODEL 1100

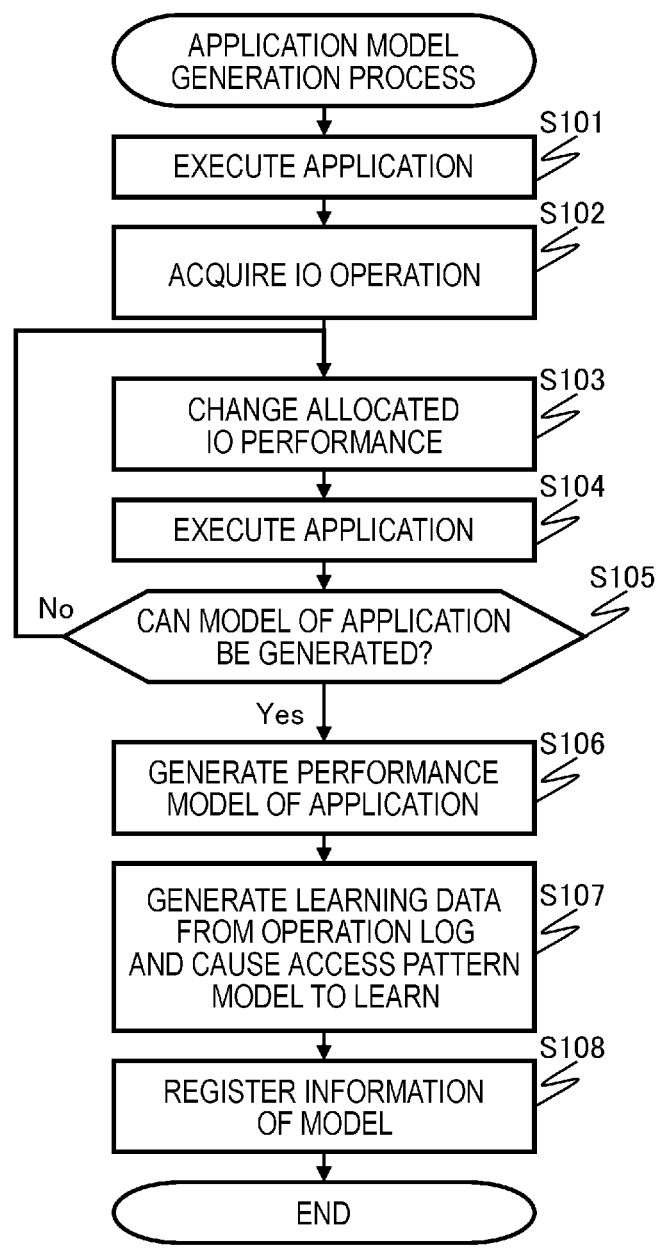

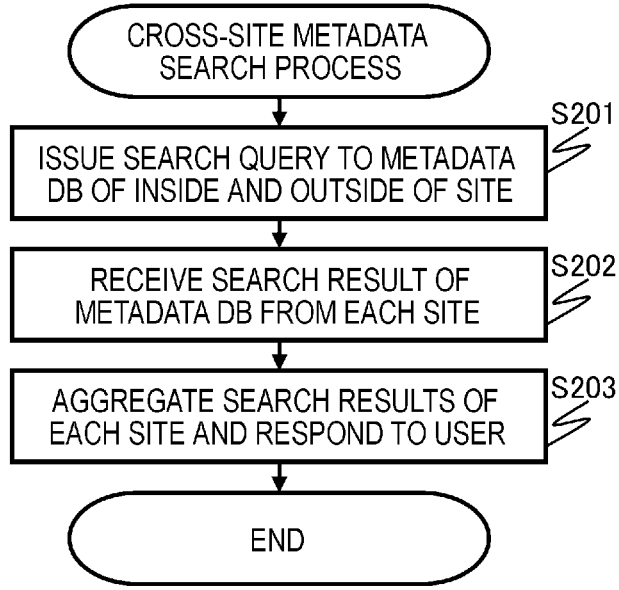
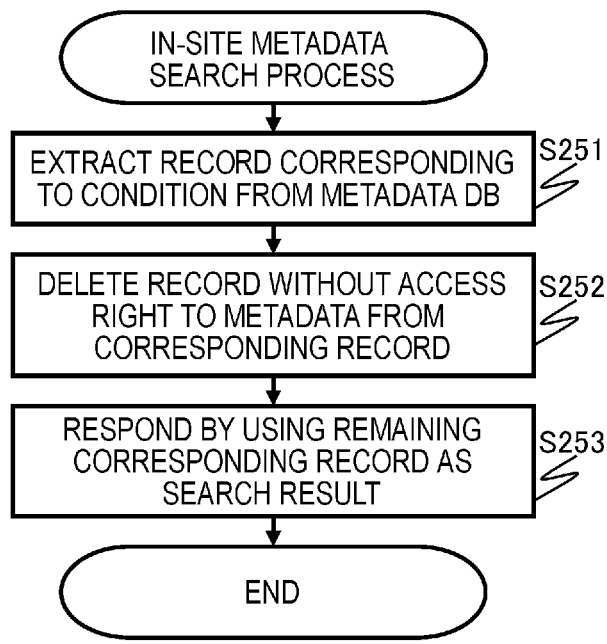

FIG. 15

CROSS-SITE METADATA SEARCH RESULT 1300

| UUID 1301 | VERSION 1302 | SITE 1303 | VIRTUAL PATH 1304 | FILE STATE 1305 | FILE TYPE 1306 | KEYWORD 1307 |
|---|---|---|---|---|---|---|
| AAAA | 2 | SITE 1 | /Dir1/File1 | Original | DOCUMENT | EDUCATION, CULTURE |
| | 1 | SITE 1 | /Dir1/File1 | Original | DOCUMENT | EDUCATION, CULTURE |
| | | SITE 2 | /Dir4/File4 | Cache | | |
| | | SITE 3 | /Dir6/File6 | Replica | | |
| DDDD | 1 | SITE 3 | /Dir7/File8 | Original | DOCUMENT | EDUCATION, SCIENCE |

FIG. 18

APPLICATION MANAGEMENT TABLE 1400

| ID 1401 | NAME 1402 | DESCRIPTION 1403 |
|---|---|---|
| A1 | APPLICATION A | IMAGE ANALYSIS |
| A2 | APPLICATION B | VOICE ANALYSIS |
| A3 | APPLICATION C | NATURAL LANGUAGE PROCESS |
| ... | | |

FIG. 20
APPLICATION EXECUTION PLAN TABLE 1600

| APPLICATION PROCESSING PERFORMANCE 1601 | SITE-TO-SITE NETWORK BANDWIDTH 1602 | TOTAL REQUIRED TIME 1603 | KPI ACHIEVEMENT POSSIBILITY 1604 |
|---|---|---|---|
| 300MB/s | 200MB/s | 35min | POSSIBLE |
| 200MB/s | 200MB/s | 40min | IMPOSSIBLE |
| 100MB/s | 200MB/s | 60min | IMPOSSIBLE |
| 300MB/s | 100MB/s | 65min | IMPOSSIBLE |
| ... | | | |

FIG. 22
PRE-DEPLOYMENT CACHE PART DETERMINATION METHOD 1800
□ PART TO BE CACHED BEFORE DEPLOYMENT
┆ ┆ PART THAT IS NOT CACHED BEFORE DEPLOYMENT
METHOD 1
FileX 500
FileY 500
METHOD 2
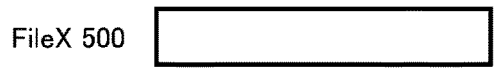
FileX 500
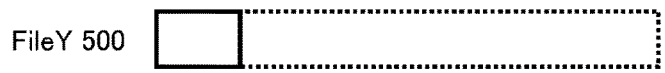
FileY 500
METHOD 3
FileX 500 (1)
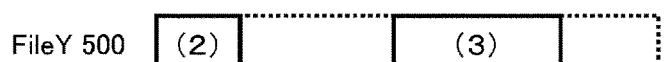
FileY 500 (2) (3)
METHOD 4
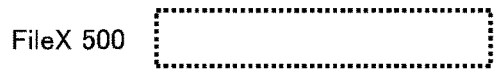
FileX 500
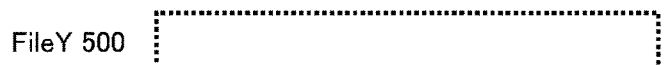
FileY 500
METHOD 5
FileX 500
FileY 500

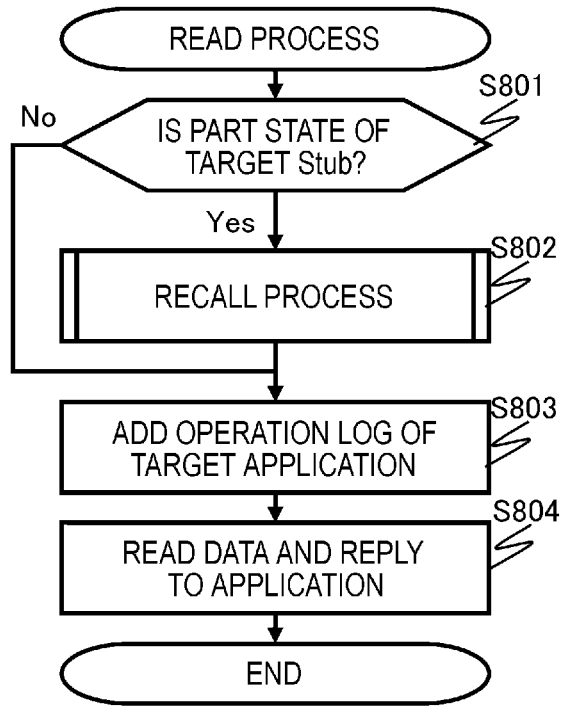

DATA CONTROL DEVICE, STORAGE SYSTEM, AND DATA CONTROL METHOD

CROSS-REFERENCE TO RELATED APPLICATION

The present application claims priority from Japanese application JP 2021-181770, filed on Nov. 8, 2021, the contents of which is hereby incorporated by reference into this application.

BACKGROUND OF THE INVENTION

1. Field of the Invention

The present invention relates to a technique for controlling reading of data units at other sites used for an application.

2. Description of Related Art

There are increasing needs for data utilization between sites such as hybrid cloud and edge-core cooperation. In this circumstance, in order to share data between sites, interest in file storage systems that have a file virtualization function is increasing.

The file virtualization function is a function of generating a stub file corresponding to a file in another site at the own site and causing the file to be considered as being at the own site. If the application performs a read access to a stub file, data in a part of the stub file to be read is acquired from the other sites. In this manner, since data is transmitted between sites, there is concern in that the performance of the application decreases.

For example, as a technique of caching data, US-A-2009/0125634 discloses a technique of caching the data at the head part of a reproducible media file from a media server and determining a cached amount of data based on a media reproduction bit rate and network transfer throughput, in a media reproduction application.

However, the technique disclosed in US-A-2009/0125634 is a technique to be performed on media files having a fixed reproduction bit rate and cannot be applied to ones other than a media reproduction application.

SUMMARY OF THE INVENTION

The present invention is conceived in view of the above circumstances, and an object thereof is to provide a technique for appropriately processing applications using data units in another sites.

In order to achieve the above purpose, a data control device according to an aspect controls a storage device that accessibly manages a data unit that is used in an application, in which the storage device is accessible to a data unit that is managed by a storage device of another site different from an own site, the data control device includes a processor, and the processor specifies an access circumstance relating to the data unit by the application, and controls caching by the storage device of the own site with respect to the data unit managed by the storage device of the other site used by the application, before the application is executed, based on the access circumstance.

According to the present invention, an application using data units in other sites can be appropriately processed.

BRIEF DESCRIPTION OF THE DRAWINGS

FIG. 5 is a diagram illustrating a configuration of a management information file according to the embodiment;

FIG. 6 is a diagram illustrating a configuration of a metadata database according to the embodiment;

FIG. 7 is a diagram illustrating a configuration of an operation log according to the embodiment;

FIG. 8 is a diagram illustrating a configuration of a site-to-site network bandwidth management table according to the embodiment;

FIG. 9 is a diagram illustrating a configuration of an application model management table according to the embodiment;

FIG. 12 is a flowchart showing an application model generation process according to the embodiment;

FIG. 13 is a flowchart showing a cross-site metadata search process according to the embodiment;

FIG. 14 is a flowchart showing an in-site metadata search process according to the embodiment;

FIG. 15 is a diagram illustrating a configuration of a cross-site metadata search result according to the embodiment;

FIG. 18 is a diagram illustrating a configuration of an application management table according to the embodiment;

FIG. 20 is a diagram illustrating a configuration of an application execution plan table according to the embodiment;

FIG. 22 is a diagram illustrating a pre-deployment cache part determination method according to the embodiment;

FIG. 27 is a flowchart showing a read process according to the embodiment.

DESCRIPTION OF EMBODIMENTS

Figure 1:
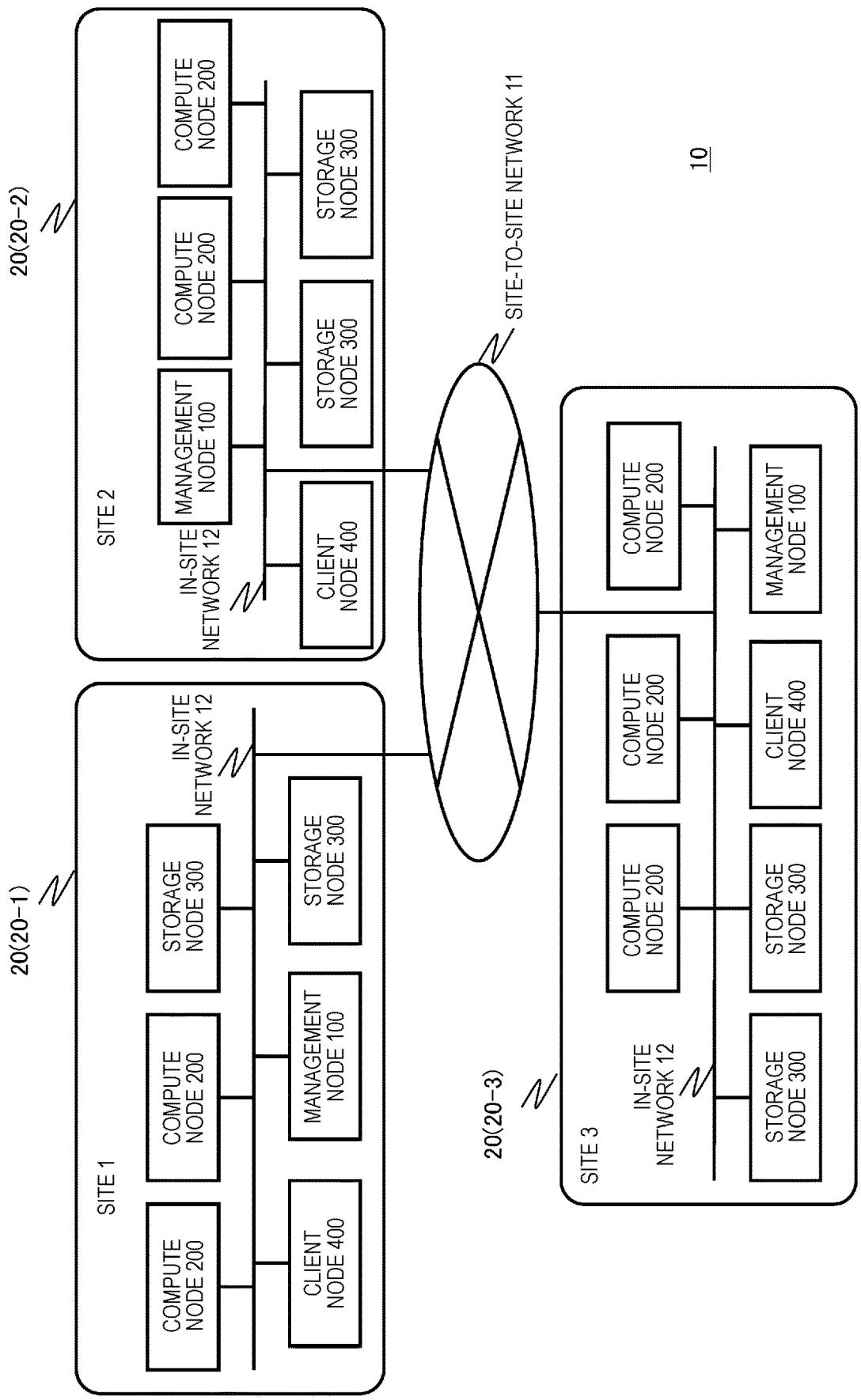
FIG. 1 a diagram illustrating an overall configuration of a computer system according to an embodiment.

Embodiments are described with reference to the drawings. In addition, the embodiments described below do not limit the invention according to the claims, and not all of the elements and combinations thereof described in the embodiments are indispensable for the means for solving the invention.

In addition, in the following description, information is described with the expressions of an "AAA file", an "AAA table", an "AAA database", an "AAA log", and the like, but the information may be expressed by any data structure. That is, in order to show that the information does not depend on a data structure, an "AAA file", an "AAA table", an "AAA database", and an "AAA log" may be referred to as "AAA information".

Further, in the following description, processing may be described by using a program as the main body of an operation, but the program is executed by a processor (for example, a CPU) so that predetermined processing is appropriately performed by using a storage resource (for example, a memory) and a communication interface device (for example, a Network Interface Card (NIC)), and thus the main body of the processing may be considered as a processor. Processing described by using a program as the main body of an operation may be processing performed by a processor or a computer (system) including the processor.

Further, in the following description, when the same type of elements are described not separately, a reference numeral (or a common code in reference numerals) is used, and when the same type of elements are described separately, an identification number (or a reference numeral) of the element may be used.

FIG. 1 is a diagram illustrating an overall configuration of a computer system according to an embodiment.

A computer system 10 includes a site system 20 (20-1) of a site 1, a site system 20 (20-2) of a site 2, and a site system 20 (20-3) of a site 3. In addition, the number of sites in the computer system 10 is not limited to three and may be any number. The site system 20-1, the site system 20-2, and the site system 20-3 are connected to each other via a site-to-site network 11. The site-to-site network 11 is, for example, a wide area network (WAN).

The site systems 20 (20-1, 20-2, and 20-3) are examples of storage systems, and each includes a management node 100, a plurality of compute nodes 200, a plurality of storage nodes 300, and one or more client nodes 400. The management node 100, the compute nodes 200, the storage nodes 300, and the client nodes 400 are connected to each other via an in-site network 12. The in-site network 12 is, for example, a local area network (LAN).

The management node 100 is an example of a data control device, and manages each device of the site system 20. The compute node 200 is an example of a computing device and configures an entity that executes an application (for example, a container, a virtual machine (VM), and a process) to process the application. The storage node 300 configures a distribution storage that distributes and manages a file or an object (data unit) with the other storage nodes 300 in the site. The client node 400 is a computer used by a user using the application, and transmits an instruction by the user to the management node 100 or displays various processing results.

Figure 2:
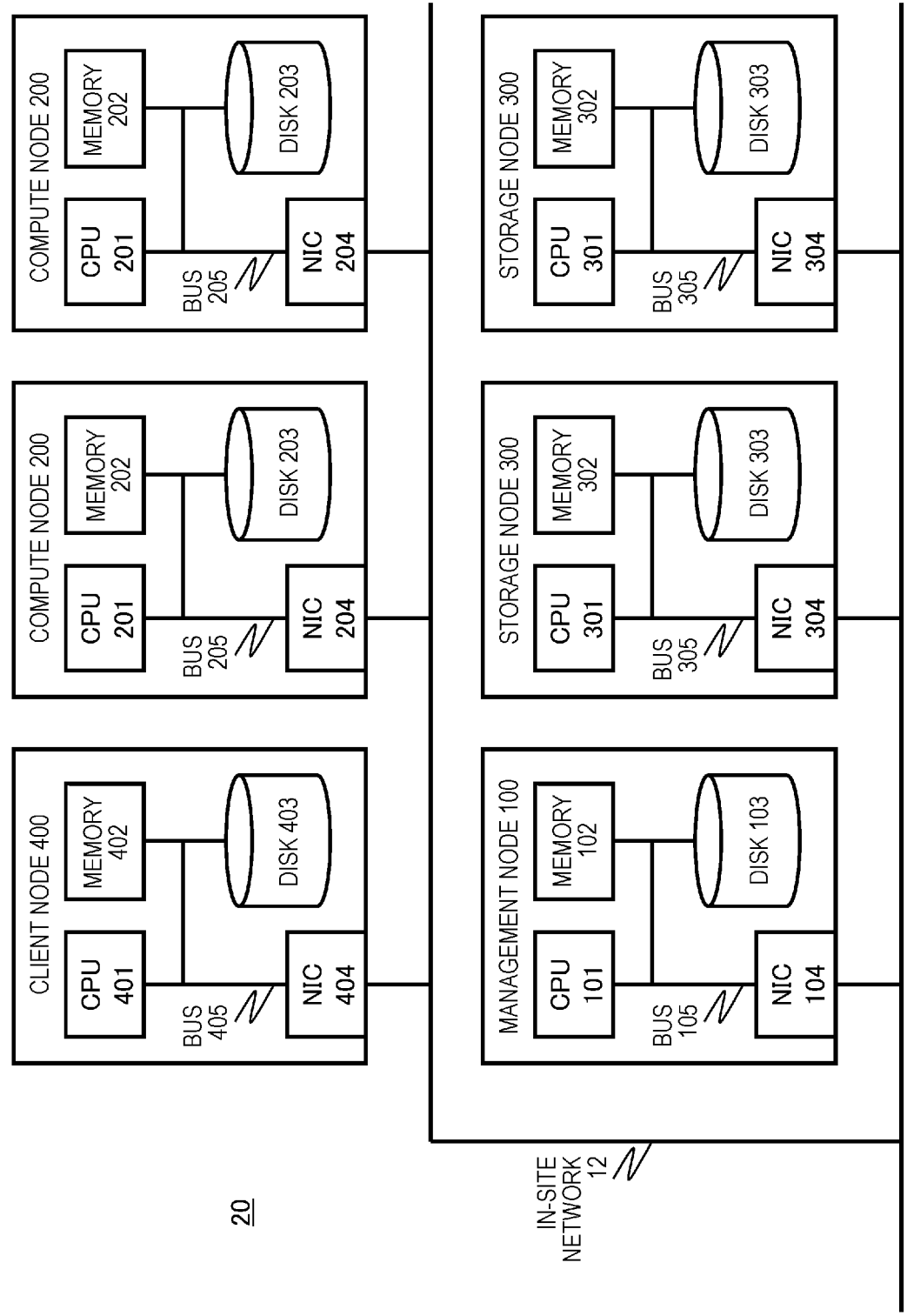
FIG. 2 is a diagram illustrating a hardware configuration of a site system of the computer system according to the embodiment.

FIG. 2 is a diagram illustrating a hardware configuration of a site system of the computer system according to the embodiment.

The site system 20 includes the management node 100, the compute nodes 200, the storage node 300, and the client node 400.

The management node 100 includes a central processing unit (CPU) 101 as an example of a processor, a memory 102, a disk 103, a network interface card (NIC) 104, and a bus 105 that connects these components.

The NIC 104 is, for example, an interface such as a wired LAN card or a wireless LAN card, and communicates with the other devices in the site via the in-site network 12 and communicates with devices in the other sites via the in-site network 12 and a site-to-site network 11.

The CPU 101 performs various processes according to programs stored in the memory 102 and the disk 103.

The memory 102 is, for example, a random access memory (RAM) and stores programs to be executed by the CPU 101 or necessary information.

The disk 103 is, for example, a hard disk, a solid state disk (SSD), or the like and stores a program to be executed by the CPU 101 and data to be used in the CPU 101.

The compute node 200 includes a CPU 201, a memory 202, a disk 203, a NIC 204, and a bus 205 that connects these components. Each component of the compute node 200 is the same as a component of the same name of the management node 100.

The storage node 300 includes a CPU 301, a memory 302, a disk 303, a NIC 304, and a bus 305 that connects these components. Each component of the storage node 300 is the same as a component of the same name of the management node 100.

The client node 400 includes a CPU 401, a memory 402, a disk 403, a NIC 404, and a bus 405 that connects these components. Each component of the client node 400 is the same as a component of the same name of the management node 100.

Figure 3:
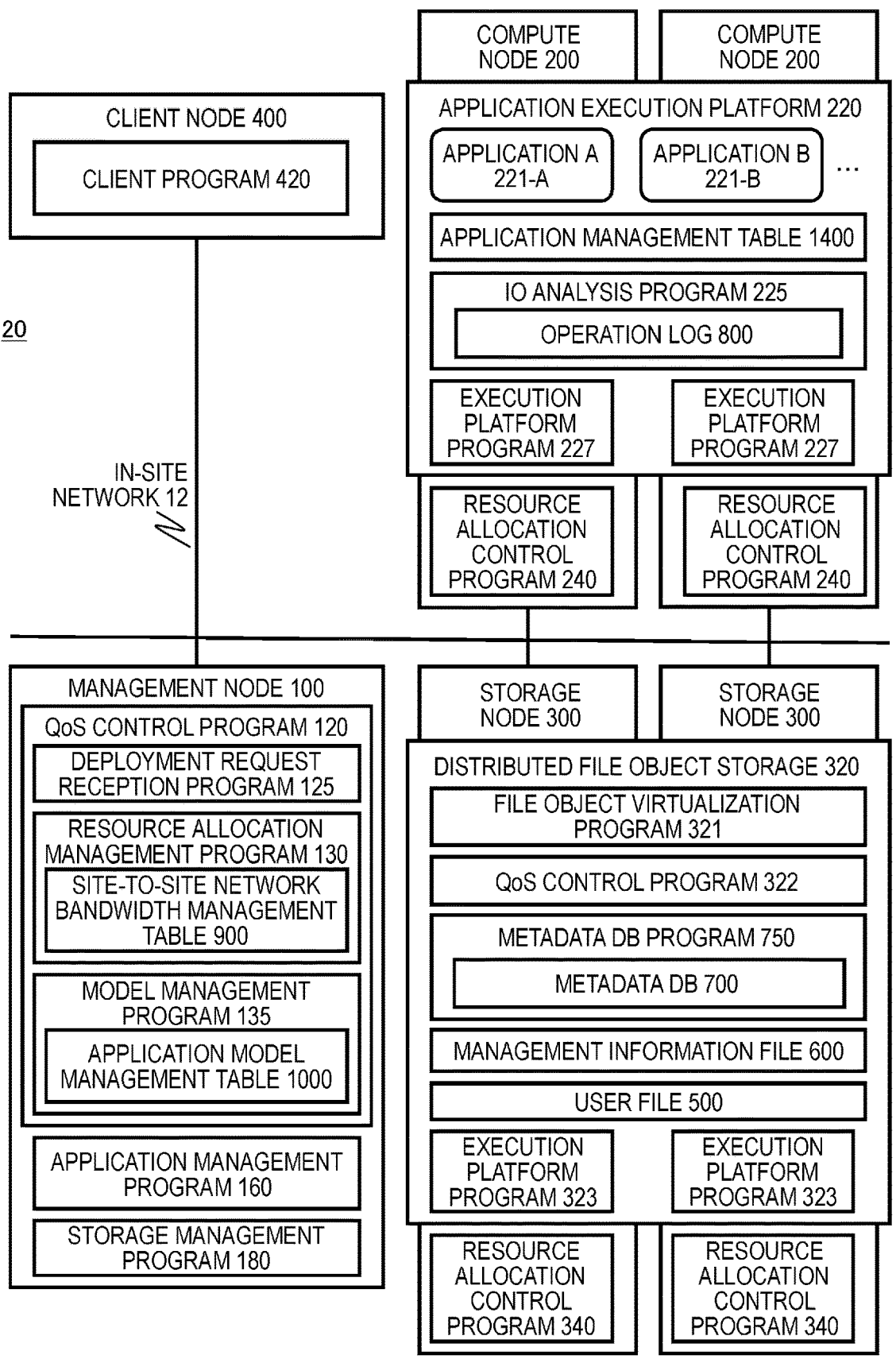
FIG. 3 is a diagram illustrating a configuration of the site system of the computer system according to the embodiment.

FIG. 3 is a diagram illustrating a configuration of a site system of the computer system according to the embodiment.

The client node 400 stores and executes a client program 420. The client program 420 transmits various requests (for example, a deployment request of an application) based on the instruction of the user to the management node 100 and displays and outputs various kinds of information from the management node 100.

The management node 100 stores and executes a Quality Of Service (QoS) control program 120, an application management program 160, and a storage management program 180.

The QoS control program 120 includes a deployment request reception program 125, a resource allocation management program 130, and a model management program 135.

The deployment request reception program 125 receives a deployment request from the client node 400 and performs a process based on the request. The resource allocation management program 130 calculates resource allocation amount to a container that executes the application based on an application model. The resource allocation management program 130 stores a site-to-site network bandwidth management table 900. The model management program 135 performs a process of managing or generating the application model. The model management program 135 stores an application model management table 1000.

The application management program 160 performs a process of managing the application. The application management program 160 transmits, for example, the deployment instruction of the application to an application execution platform 220 described below.

The storage management program 180 performs a management process of a distributed file and object storage 320 configured with the storage node 300. Specifically, the storage management program 180 operates data managed by the distributed file and object storage 320, provides a UI for searching metadata with respect to a file to the client node 400, and instructs the distributed file and object storage 320 to search the metadata.

The compute node 200 stores and executes an execution platform program 227 and a resource allocation control program 240.

The resource allocation control program 240 controls allocation of the resource to the application.

The execution platform program 227 configures the application execution platform 220 in cooperation with the execution platform program 227 of the other compute node 200 (the compute node 200 in the same site according to the present embodiment).

In the application execution platform 220, one or more containers that execute the application are configured. FIG. 3 illustrates an example in which a container including an application 221-A (an application A) and an application 221-B (an application B) is configured.

In addition, an application management table 1400 and an IC analysis program 225 are stored in the application execution platform 220. The application management table 1400 stores information of the application that can be deployed in the application execution platform 220. The IC analysis program 225 generates and manages an operation log 800 when the application is executed.

The storage node 300 stores and executes an execution platform program 323 and a resource allocation control program 340.

The resource allocation control program 340 controls the allocation of the resource with respect to the distributed file and object storage 320 described below.

The execution platform program 323 configures the distributed file and object storage 320 in cooperation with the execution platform program 323 of the other storage node 300 (the storage node 300 in the same site according to the present embodiment). The distributed file and object storage 320 is an example of the storage device.

The distributed file and object storage 320 performs a process of distributing and managing a data unit such as a file and an object. The distributed file and object storage 320 includes a file and object virtualization program 321, a QoS control program 322, a metadata DB (database) program 750, a management information file 600, and a user file 500.

The file and object virtualization program 321 performs a virtualization process causing a user file in the other site to be considered to be in the own site. For example, the file and object virtualization program 321 manages a cache circumstance of data of a stub file (stub object) or a circumstance of replication of a file. The QoS control program 322 performs IC control to be allocated to the application.

The metadata DB program 750 manages a metadata DB 700, searches for the metadata DB 700 in the own site based on a search query, and transmits a search result to a request source. The metadata DB 700 stores metadata of a user file managed in the distributed file and object storage 320. The management information file 600 stores management information used by the file and object virtualization program 321. The user file 500 is a file (user file) used by the user of the distributed file and object storage 320.

Figure 4:
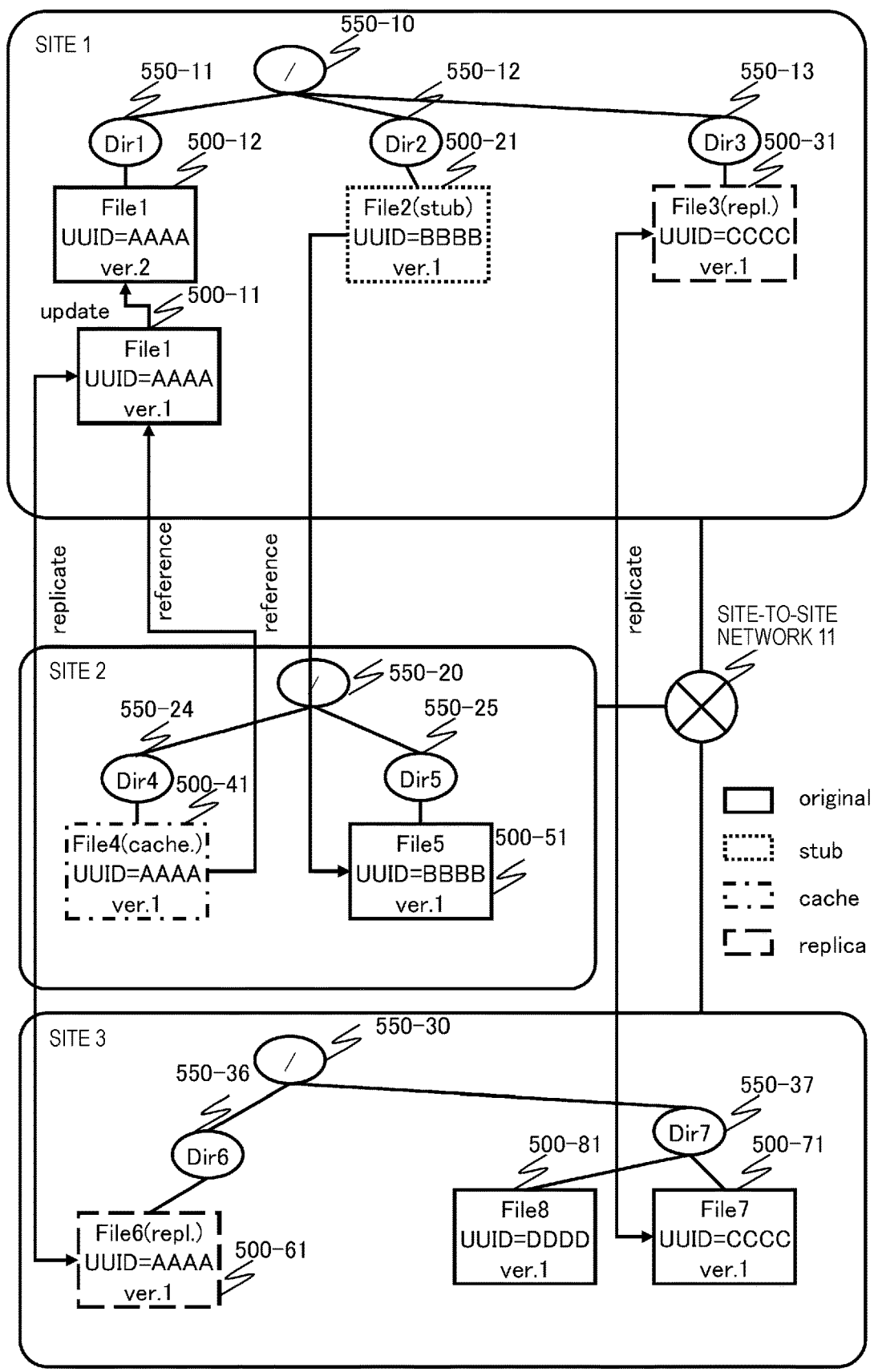
FIG. 4 is a diagram illustrating an example of a relationship between files managed by file systems in sites of the computer system according to the embodiment.

FIG. 4 is a diagram illustrating an example of a relationship between files managed by the file system of each site of the computer system according to the embodiment.

In the present embodiment, the type of the file dealt in the file system is any one of an original file (original file: original in FIG. 4), a stubbed file (stub file: stub in FIG. 4), a cached file (cache file: cache in FIG. 4), and a replicated file (replica file: replica in FIG. 4). The stub file, the cache file, and the replica file are created by the file and object virtualization program 321.

Here, the original file is a file generated and managed in the site and including an actual data of the file, the stub file is a file that is created for referring to the data of the original file in the other site, the cache file is a file in which all data in the file in the stub file is cached, the replica file is a file obtained by replicating the original file in the other site for the purpose of backup or the like. In addition, in the file system according to the present embodiment, the UUID of the stub file, the cache file, and the replica file corresponding to a certain original file is the same as the UUID of the original file.

The file system (the file system managed by the distributed file and object storage 320) of the site 1 includes a root directory 550-10, directories 550-11, 550-12, and 550-13.

The files 500-11 and 500-12 are stored in the directory 550-11. In the file system, the files 500 can be specified by universally unique identifiers (UUIDs) that are unique in the distributed file and object storages 320 in the plurality of sites. According to the present embodiment, with respect to the files, versions are further managed, and a file of a specific version can be specified by the UUID and the version number.

The file 500-11 is an original file having a file name of File 1, a UUID of AAAA, and a version number of ver. 1. The file 500-12 is a file that is an updated version of the file 500-11 and has a version number updated to ver. 2.

A file 500-21 is stored in the directory 550-12. The file 500-21 is a stub file using the file 500-51 stored in the site 2 as an original file.

A file 500-31 is stored in the directory 550-13. The file 500-31 is a replica file obtained by replicating a file 500-71 stored in the site 3.

The file system of the site 2 includes a root directory 550-20 and directories 550-24 and 550-25.

A file 500-41 is stored in the directory 550-24. The file 500-41 is a cache file corresponding to the file 500-11 of the site 1. A file 500-51 is stored in the directory 550-25. With respect to the file 500-51, the corresponding stub file 500-21 is stored in the site 1.

The file system of the site 3 includes the root directory 550-30 and directories 550-36 and 550-37.

A file 500-61 is stored in the directory 550-36. The file 500-61 is a file obtained by replicating the file 500-11 of the site 1. The files 500-71 and 500-81 are stored in the directory 550-37. The file 500-21 obtained by replicating the file 500-71 is stored in the site 1.

Next, a management information file 600 is described.

FIG. 5 is a diagram illustrating a configuration of the management information file according to the embodiment. In addition, for example, the management information file in FIG. 5 corresponds to the file 500-12 of FIG. 4.

The management information file 600 is created per user file 500. The management information file 600 includes user file management information 610 and part management information 650.

The user file management information 610 includes fields of a UUID 611, a version 612, a virtual path 613, a file state 614, a reference destination site 615, a reference source site 616, a replication destination site 617, a replication source site 618, and a metadata registered flag 619.

The UUID of the user file 500 (referred to as a corresponding user file in the description of FIG. 5) corresponding to the management information file 600 is stored in the UUID 611. The version number of the corresponding user file 500 is stored in the version 612. A file path indicating a storage destination of the corresponding user file in the file system in the site is stored in the virtual path 613. The state of the corresponding user file is stored in the file state 614. The state of the file is any one of Original, Stub, Cache, and Replica.

When the corresponding user file is a stub file, a site name of a site (a reference destination site) in which an original file corresponding to the file is stored is stored in the reference destination site 615. A site name of a site (a reference source site) in which the stub file corresponding to the corresponding user file is stored is stored in the reference source site 616. A site name of the site (a replication destination site) in which the replica file of the corresponding user file is stored is stored in the replication destination site 617. When the corresponding user file is the replica file, a site name of the site (the replication source site) in which the original file corresponding to this file is stored is stored in the replication source site 618. A flag indicating whether the metadata of the corresponding user file is registered in the metadata DB 700 is stored in the metadata registered flag 619. When the metadata is registered, True is set in the metadata registered flag 619, and when the metadata is not registered, False is set in the metadata registered flag 619.

The part management information 650 includes an entry corresponding to each part of the corresponding user file. The entry of the part management information 650 includes fields of an offset 651, a size 652, and a part state 653.

An offset value indicating a head position of the part corresponding to the entry in the corresponding user file is stored in the offset 651. The data size of the part corresponding to the entry is stored in the size 652. The state of the part corresponding to the entry is stored in the part state 653. Examples of the state of the part include Cache, Dirty, and Stub. Cache indicates that the actual data of the part corresponding to the entry is included, and the actual data is replicated in the replication destination site, Dirty indicates that the actual data of the part corresponding to the entry is included, and the actual data is not replicated in the replication destination site, and Stub indicates that the actual data of the part corresponding to the entry is not included, that is, the actual data is required to be acquired (recalled) from the other site when there is an access request to the part.

Next, a metadata DB 700 is described.

FIG. 6 is a diagram illustrating a configuration of the metadata database according to the embodiment. In addition, the metadata DB 700 in FIG. 6 corresponds to the metadata DB 700 of the site 1 in FIG. 4.

The metadata DB 700 is provided in each site, and entries per file is stored in the site. The entry of the metadata DB 700 includes fields of a UUID 701, a version 702, a virtual path 703, a file state 704, a file type 705, and a keyword 706. In addition, when a plurality of versions with respect to the file are present, a plurality of sets (the version 702, the virtual path 703, the file state 704, the file type 705, and the keyword 706) are associated with one UUID 701.

The UUID of the user file 500 (referred to as the corresponding user file in the description of FIG. 6) corresponding to the entry is stored in the UUID 701. A version number corresponding to each version in the corresponding user file 500 is stored in the version 702. A file path indicating the storage destination of the corresponding user file (each version if there are versions) in the file system in the site is stored in the virtual path 703. A state of the corresponding user file is stored in the file state 704. The state of the file is any one of Original, Stub, Cache, and Replica. A file type of the corresponding user file 500 is stored in the file type 705. A keyword relating to the corresponding user file is stored in the keyword 706.

Next, an operation log 800 is described.

FIG. 7 is a diagram illustrating the configuration of the operation log according to the embodiment.

In each site, the operation log 800 is generated and managed per application. The operation log 800 is used for creating access pattern model learning data 1220 (see FIG. 11) described below. The operation log 800 stores the entry per operation.

The entry of the operation log 800 includes fields of an APP ID 801, a container ID 802, an operation 811, a UUID 812, a version 813, a path 814, a type 815, an offset 816, a size 817, and a time stamp 818.

An identifier (an APP ID) of the application corresponding to the entry is stored in the APP ID 801. An identifier (a container ID) of the container that is an entity that executes the application corresponding to the entry is stored in the container ID 802. In addition, in the application execution platform 220, when the entity that executes the application is a virtual machine (VM) or a process, the identifier of the entity thereof may be stored in the container ID 802. The type of the operation (an operation content) corresponding to the entry is stored in the operation 811. Examples of the operation include reading, Writing, and Creating. A UUID of a user file or a directory that is a target of the operation corresponding to the entry is stored in the UUID 812. A version number of the user file that is a target of the operation corresponding to the entry is stored in the version 813. The path to the user file or the directory that is a target of the operation corresponding to the entry is stored in the path 814. The type of the user file or the directory that is a target of the operation corresponding to the entry is stored in the type 815. An offset value indicating the head of the data of the user file that is a target of the operation corresponding to the entry is stored in the offset 816. The size of the data of the user file that is a target of the operation corresponding to the entry is stored in the size 817. A time stamp indicating the time when the operation corresponding to the entry is performed is stored in the time stamp 818.

Next, a site-to-site network bandwidth management table 900 is described.

FIG. 8 is a diagram illustrating a configuration of a site-to-site network bandwidth management table according to the embodiment.

The site-to-site network bandwidth management table 900 manages each site-to-site network bandwidth. The leftmost column of the site-to-site network bandwidth management table 900 indicates sites as transmission sources (the transmission source site), the uppermost row indicates sites as transmission destinations (transmission destination sites), and network bandwidths between the transmission source sites and the transmission destination sites are stored in the fields corresponding to these sites (fields in which the rows of the transmission source sites and the columns of the transmission destination sites intersect with each other).

Next, an application model management table 1000 is described.

FIG. 9 is a diagram illustrating a configuration of the application model management table according to the embodiment.

The application model management table 1000 stores the entry per application. The entry of the application model management table 1000 includes fields of an application 1001, performance model information 1010, access pattern model information 1020, and allowable read latency 1002.

An application name of the application corresponding to the entry is stored in the application 1001. Information of the performance model of the application corresponding to the entry is stored in the performance model information 1010. The performance model information 1010 includes fields of IC operation 1011 and a performance model formula 1012. An IC operation in the application corresponding to the entry is stored in the IC operation 1011. A formula (performance model formula) indicating the performance model in the IC operation of the application corresponding to the entry is stored in the performance model formula 1012.

The information of the access pattern model of the application corresponding to the entry is stored in the access pattern model information 1020. The access pattern model information 1020 includes a field of an access pattern model storage path 1021. A path indicating the storage position of the access pattern model of the application corresponding to the entry is stored in the access pattern model storage path 1021.

Read latency (allowable read latency) allowed in the application corresponding to the entry is stored in the allowable read latency 1002. Here, the allowable read latency may be read latency in which the application times out or the performance is significantly deteriorated. In addition, in the example of FIG. 9, values of the read latency are stored in the allowable read latency 1002, but the present invention is not limited thereto, and for example, information of the read latency model that enables the estimation of the allowable read latency may be stored.

Next, a performance model 1100 is described.

Figure 10:
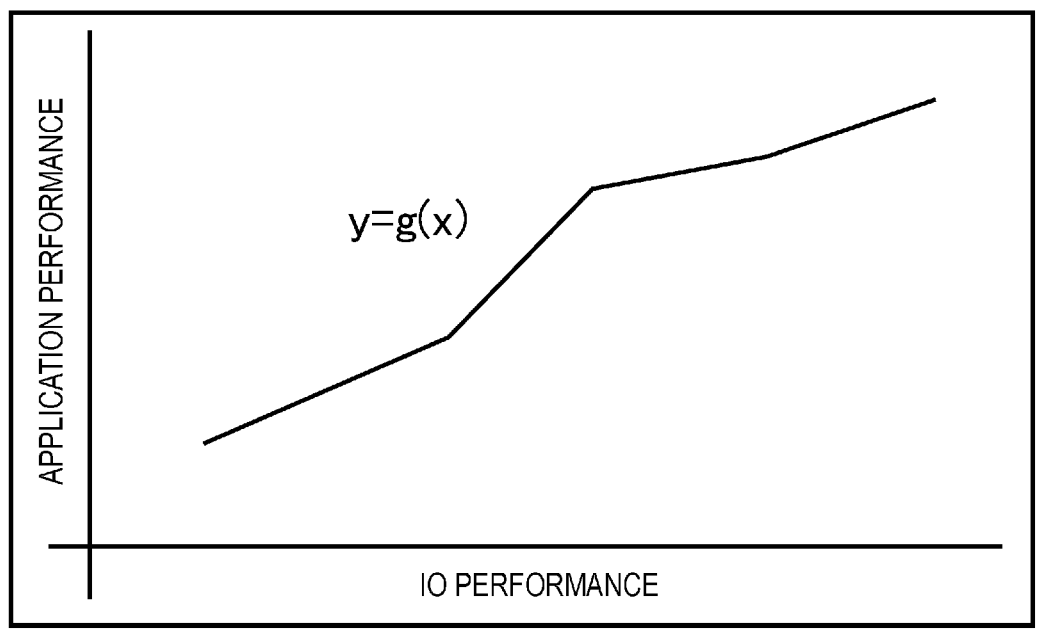
FIG. 10 is a diagram illustrating an outline of a performance model according to the embodiment.

FIG. 10 is a diagram illustrating an outline of the performance model according to the embodiment.

The performance model 1100 is generated, for example, by repeatedly changing the IC performance of the application (an example of the access performance and the access circumstance), and measuring the application performance (the processing performance of the application) at the moment, and generating a graph of the application performance on the change of the IC performance as illustrated in FIG. 10, so that the formula of the approximate curve of the graph, $y=g(x)$, may be used as the performance model. This performance model is stored in the performance model formula 1012 of the corresponding application of the application model management table 1000. The generation of the graph and the derivation of the approximate curve formula in the generation of the performance model can be embodied by using existing spreadsheet software, programs, and the like. In addition, the performance model is not limited to being stored as an approximate curve, and may be stored, for example, as a machine learning model. Here, the application performance may be, for example, a data processing amount per unit time in the application and may be the number of processes for the request per unit time by the application or the number of files processed per unit time.

In addition, a plurality of performance models for one application may be generated. For example, if the application can be executed by being selected from a plurality of algorithms, the performance model may be generated for each algorithm to be executed. In addition, if the performance is changed by the data type to be analyzed in the application, the performance model may be generated per data type to be analyzed. In addition, the performance model may be generated per IC operation of the application.

Next, an access pattern model 1200 is described.

Figure 11:
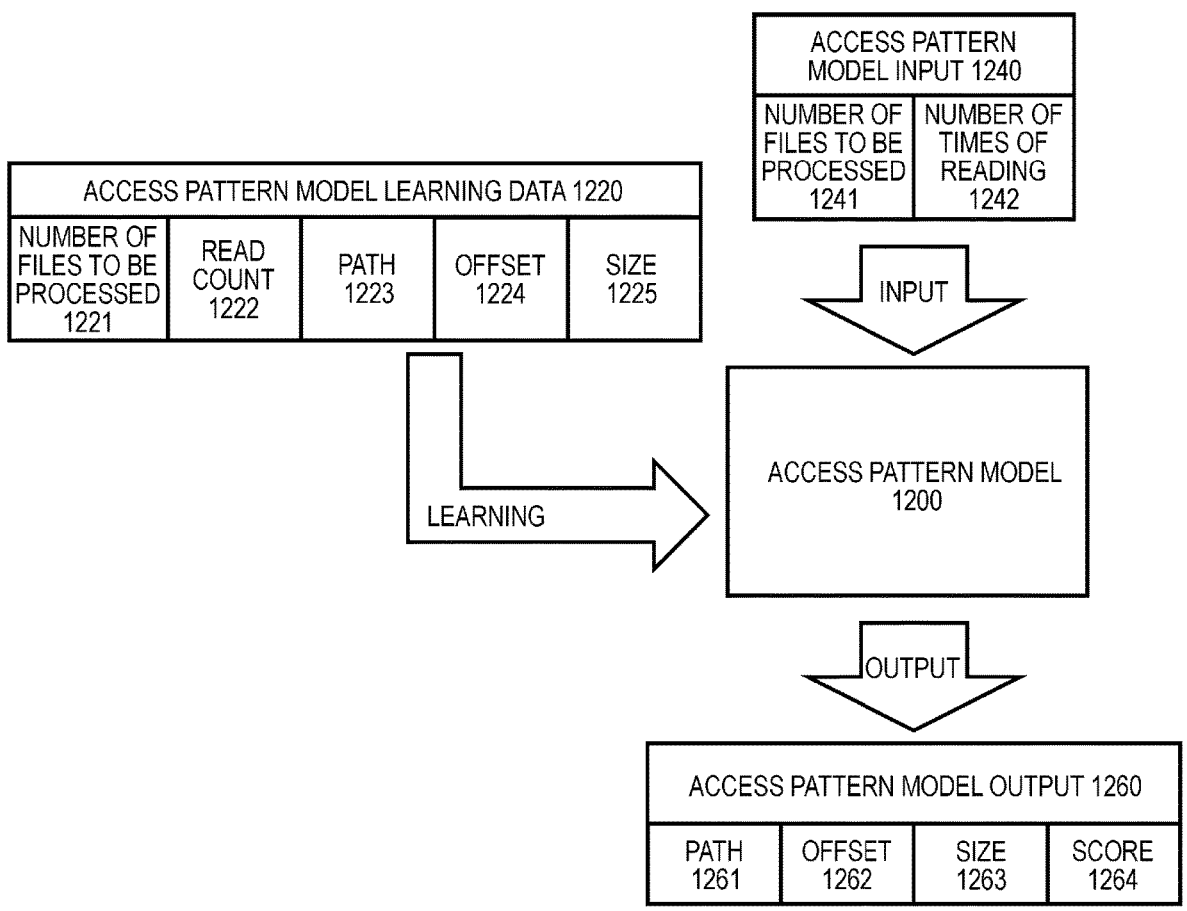
FIG. 11 is a diagram illustrating an access pattern model according to the embodiment.

FIG. 11 is a diagram illustrating the access pattern model according to the embodiment.

The access pattern model 1200 is created per application. The access pattern model 1200 may be stored in the format such as a machine learning model (including a deep learning model).

If an access pattern model input 1240 is input, the access pattern model 1200 infers the access pattern (an example of the access circumstance) of the application predicted based on the input and outputs an access pattern model output 1260 as an inference result.

The access pattern model input 1240 includes the number of files to be processed 1241 and the number of times of reading 1242. The number of files to be processed 1241 is the number of files to be processed in the application. The number of times of reading 1242 is an order (the number of times of reading) of reading of which the access pattern in the application is desired to be determined.

The access pattern model output 1260 includes a path 1261, an offset 1262, a size 1263, and a score 1264. The path 1261 is a path to a file to which the access is estimated. The offset 1262 is an offset indicating a part of the file to which the access is estimated. The size 1263 is a size of a part of the file to which the access is estimated. The score 1264 is a score indicating the certainty of the inference result.

The access pattern model 1200 is learned by using the access pattern model learning data 1220. The access pattern model learning data 1220 stores the entry per reading in the application using the access pattern model 1200 as a target. The entry of the access pattern model learning data 1220 includes fields of the number of files to be processed 1221, the number of times of reading 1222, a path 1223, an offset 1224, and a size 1225. A total number of files to be processed by the application is stored in the number of files to be processed 1221. An order (the number of times of reading) of the reading corresponding to the entry is stored in the number of times of reading 1222. A path of the file subjected to the reading corresponding to the entry is stored in the path 1223. An offset indicating the part of the file subjected to the reading corresponding to the entry is stored in the offset 1224. A size of the data read in the reading corresponding to the entry is stored in the size 1225. The entry of the access pattern model learning data 1220 can be generated by extracting necessary information from the operation log 800.

In addition, in FIG. 11, an example of information that is input and output to the access pattern model 1200 is illustrated, but the input and output to the access pattern model 1200 is not limited to the illustrated example. For example, as an example, the access pattern model corresponding to the information for a plurality of times of read access immediately before is input, and a plurality of times of read access immediately after may be predicted and output. In addition, a UUID of a file path or a parent directory may be input or output to the access pattern model 1200. In addition, the specific configuration of the access pattern model 1200 is not particularly limited, and may be a well-known learning model used in machine learning (including deep learning).

Next, the processing operation in the computer system 10 is described.

FIG. 12 is a flowchart showing the application model generation process according to the embodiment.

In the application model generation process according to the present embodiment, the application models (the performance model and the access pattern model) are generated per application. The application model generation process is performed by the management node 100, for example, when a new application is registered.

The model management program 135 (strictly, the CPU 101 that executes the model management program 135) of the management node 100 causes the application to be executed by instructing the application execution platform 220 to execute the newly registered application (Step S101).

The model management program 135 acquires the operation log 800 of the IC operation of the application while being executed and the application performance (Step S102). Here, the application performance may be acquired based on the size of data to be processed and the processing time, for example, may be the data processing amount per unit time in the application, and may be the number of times of processing to the request per unit time in the application or the number of files to be processed per unit time.

Next, the model management program 135 changes the IC performance allocated to the application (the entity of the application) (Step S103), causes the application execution platform 220 to execute the application, and acquires the operation log 800 of the IC operation and the application performance (Step S104). According to this process, for the generation of the performance model 1100, one item of data showing the corresponding relationship between the application performance and the IC performance is obtained.

Next, the model management program 135 determines whether the performance model 1100 of the application can be generated, specifically, whether the necessary number of times of the performance measurement for generating the performance model 1100 is performed (Step S105).

As a result, if the necessary number of times of the measurement for generating the performance model is not performed (Step S105: No), the model management program 135 causes the process to proceed to Step S103 to repeat the change of the IC performance and the application performance measurement. In addition, the number of times of the performance measurement for generating the performance model 1100 and the change amount of the IC performance that is changed per performance measurement are determined in advance.

Meanwhile, if the necessary number of times of the measurement for generating the performance model is performed (Step S105: Yes), the model management program 135 generates the performance model 1100 based on the plurality of measurement results (Step S106).

Next, the model management program 135 generates the access pattern model learning data 1220 from the operation log 800 acquired when the application is executed, creates (teaches) the access pattern model 1200 by using the access pattern model learning data 1220 (Step S107), registers the generated performance model 1100 and the generated access pattern model 1200 to the application model management table 1000 (Step S109), and ends the process.

According to this application model generation process, the performance model and the access pattern model corresponding to the application can be appropriately generated.

Next, in order to enables the user to search for a desired file, the cross-site metadata search process and the in-site metadata search process performed due to the transmission of the search request by the client node 400 are described.

FIG. 13 is a flowchart showing the cross-site metadata search process according to the embodiment.

A cross-site metadata search process S200 starts when the storage node 300 receives the file search request from the client node 400.

First, when the file search request is received, the metadata DB program 750 issues the search query corresponding to the file search request to the metadata DB programs 750 of the own site and the other sites (Step S201). As a result, the metadata DB program 750 of each site performs an in-site metadata search process S250 and transmits the search result to the metadata DB program 750 as the request source.

Next, the metadata DB program 750 receives the search result that is a response to the search query from each site (Step S202). Next, the metadata DB program 750 generates a cross-site metadata search result 1300 (see FIG. 15) by aggregating the received search results of each site and responds to the client node 400 that transmits the file search request, that is, transmits the cross-site metadata search result 1300 (Step S203).

FIG. 14 is a flowchart showing the in-site metadata search process according to the embodiment.

The in-site metadata search process S250 starts when the metadata DB program 750 receives the search query issued in Step S201.

First, when the metadata DB program 750 receives the search query, the metadata DB program 750 extracts a record corresponding to a condition of the search query from the metadata DB 700 (Step S251). Next, the metadata DB program 700 deletes a record without an access right to the metadata from the extracted records (Step S252). Next, the metadata DB program 700 responds to the metadata DB program 750 that issues the search query by using the remaining records as the search result (Step S253).

FIG. 15 is a diagram illustrating a configuration of the cross-site metadata search result according to the embodiment.

The example illustrated in FIG. 15 shows cross-site metadata search results when a search request of a file relating to "Education" is transmitted from the client node 400.

The cross-site metadata search result 1300 includes an entry corresponding to the searched file. The entry of the cross-site metadata search result 1300 includes fields of a UUID 1301, the version 1302, a site 1303, a virtual path 1304, a file state 1305, a file type 1306, and a keyword 1307.

The UUID of the user file 500 of the search result is stored in the UUID 1301. A version number of the user file 500 of the search result is stored in the version 1302. A site name of the site where the user file 500 of the search result is stored is stored in the site 1303. A file path indicating the position in the site where the user file 500 of the search result is stored is stored in the virtual path 1304. A state of the user file 500 of the search result is stored in the file state 1305. The state of the file is any one of Original, Stub, Cache, and Replica. A type of the user file 500 of the search result is stored in the file type 1306. Examples of the file type include a document and an image. A keyword relating to the user file 500 of the search result is stored in the keyword 1307.

Figure 16:
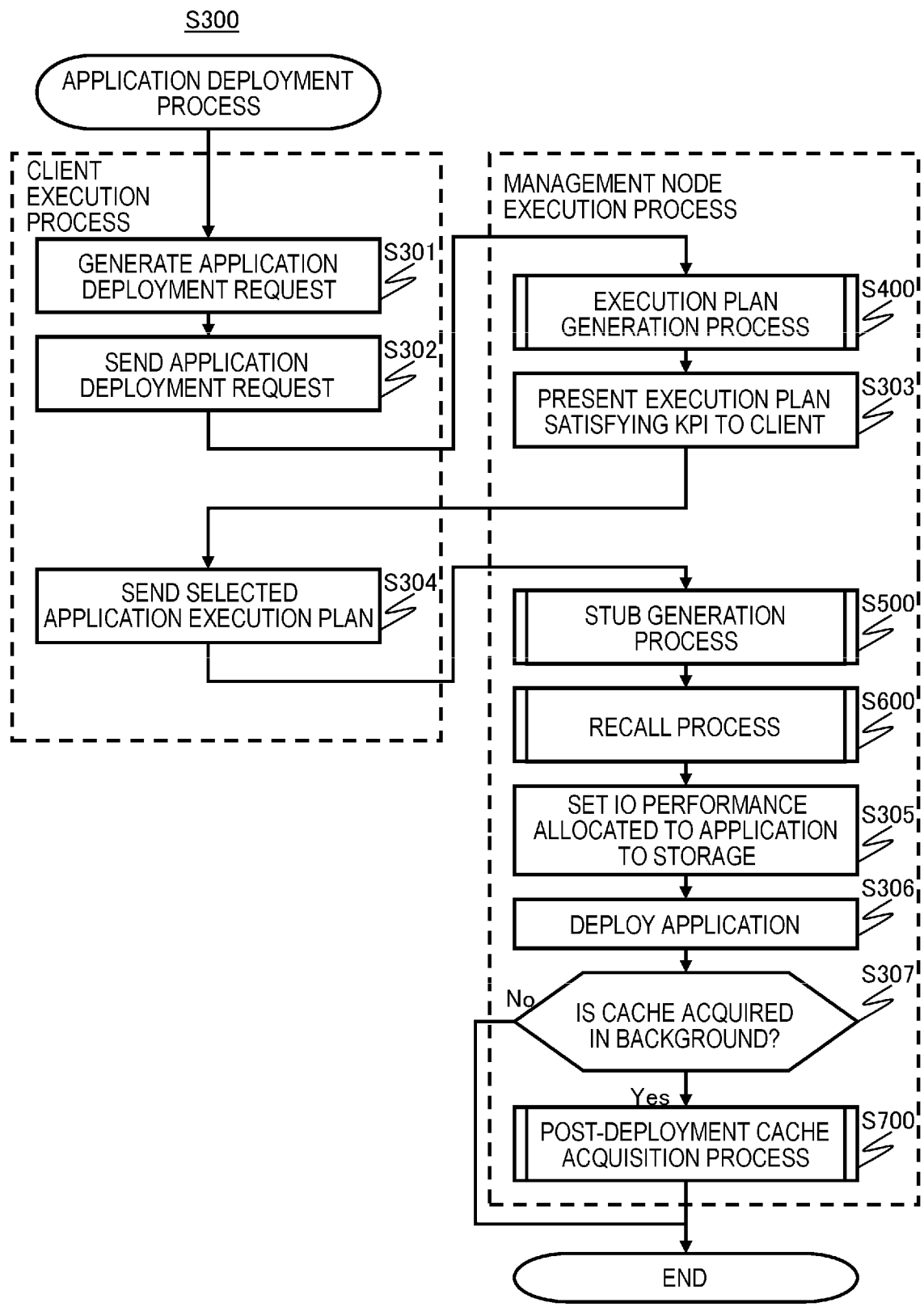
FIG. 16 is a flowchart showing an application deployment process according to the embodiment.

Next, an application deployment process is described. FIG. 16 is a flowchart showing the application deployment process according to the embodiment.

The application deployment process is performed when there is an execution request of the application from the user to the client node 400.

For example, when the execution request of the application (the application execution request) is received from the user via an application execution request screen 1500 (see FIG. 19) or the like, the client program 420 (the CPU 401 that executes the client program 420) of the client node 400 generates the request for deploying the application (the application deployment request) according to the execution request (Step S301) and transmits the application deployment request to the management node 100 (Step S302).

The deployment request reception program 125 of the management node 100 receives the application deployment request, and the QoS control program 120 generates an application execution plan table 1600 (see FIG. 20) by performing an execution plan generation process (S400: see FIG. 17) and presents the application execution plan satisfying the key performance indicator (KPI) to the client node 400 (Step S303).

The client program 420 of the client node 400 causes the presented application execution plan to be displayed, receives the selection of the application execution plan to be performed, from the user, and transmits the received application execution plan to the management node 100 (Step S304).

Figure 23:
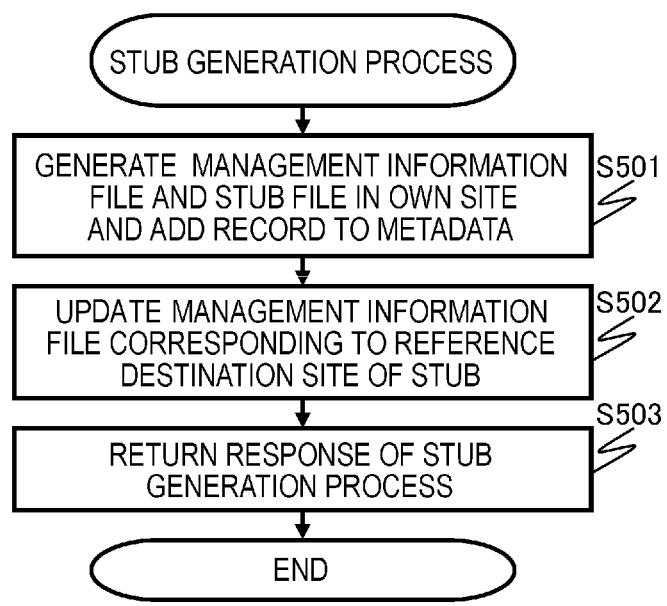
FIG. 23 is a flowchart showing a stub generation process according to the embodiment.

The QoS control program 120 of the management node 100 transmits the stub generation request to the file and object virtualization program 321 of the storage node 300 via the storage management program 180 and causes a stub generation process of generating a stub file (a stub object) of a file (an object) including data referred by the application designated by the application execution plan to be executed (Step S500: FIG. 23). Here, the information for specifying a file including data referred by the application designated by the application execution plan is included in the stub generation request.

Figure 24:
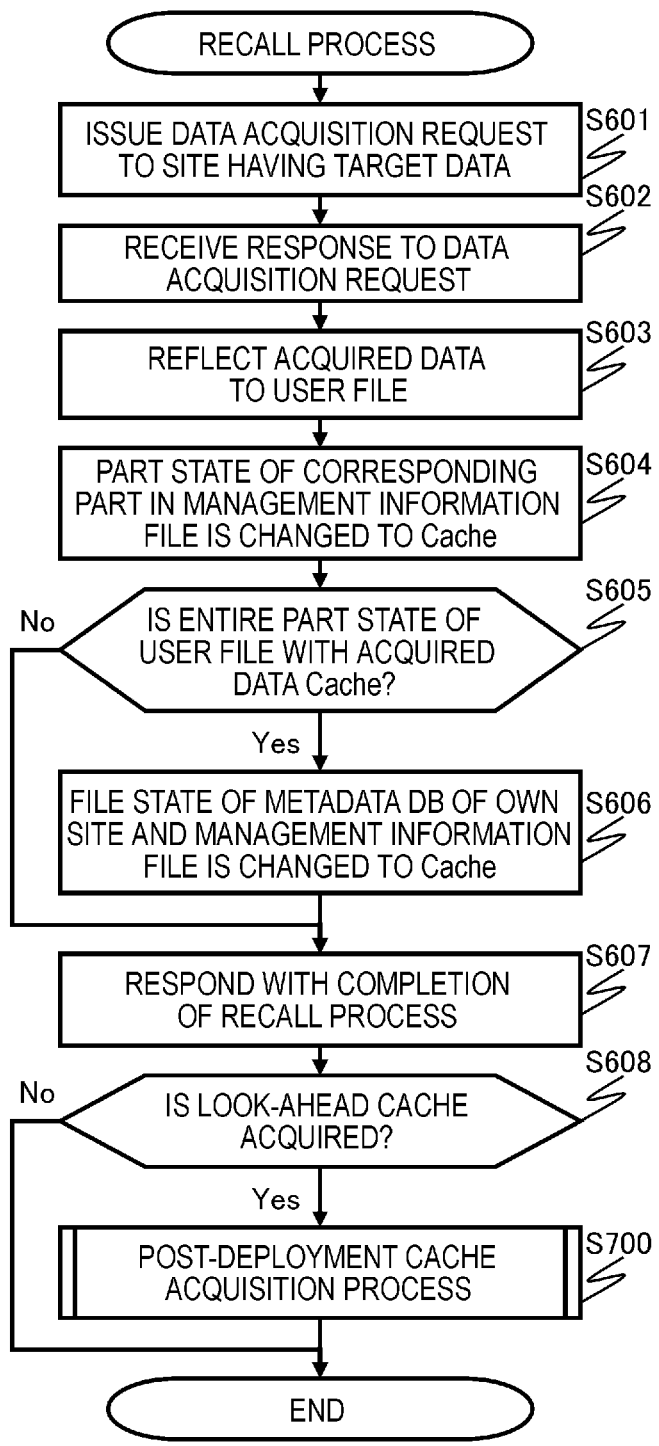
FIG. 24 is a flowchart showing a recall process according to the embodiment.

Subsequently, the QoS control program 120 transmits the recall request to the file and object virtualization program 321 via the storage management program 180 and causes a recall process (Step S600: FIG. 24) for acquiring data to be cached before deployment of the application to be executed. Here, the information for specifying the data to be cached before deployment (for example, at least a part of a site name, a virtual path, an offset, a size) in the application execution plan selected by the user is included in the recall request.

Next, the QoS control program 120 causes the resource allocation control program 340 to set the IC performance to be allocated to the application to be deployed to the distributed file and object storage 320 (Step S305) and causes the application to be deployed in the execution platform program 227 via the storage management program 180 (Step S306).

Figure 25:
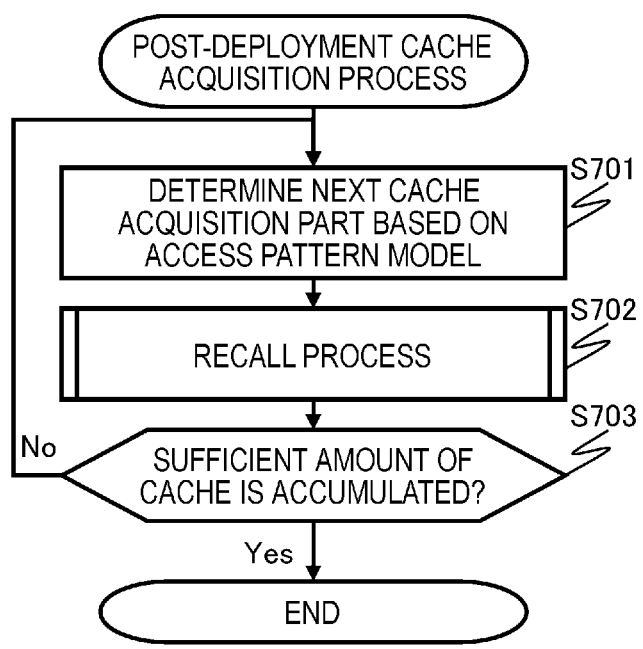
FIG. 25 is a flowchart showing a post-deployment cache acquisition process according to the embodiment.

Next, the QoS control program 120 determines whether to acquire the cache in the background (Step S307) and ends the process when it is determined not to acquire the cache (Step S307: No). Meanwhile, if it is determined to acquire the cache (Step S307: Yes), the QoS control program 120 causes the file and object virtualization program 321 to perform a post-deployment cache acquisition process (Step S700: FIG. 25) for acquiring cache after the deployment and thereafter ends the process.

Next, the execution plan generation process (S400) is described.

Figure 17:
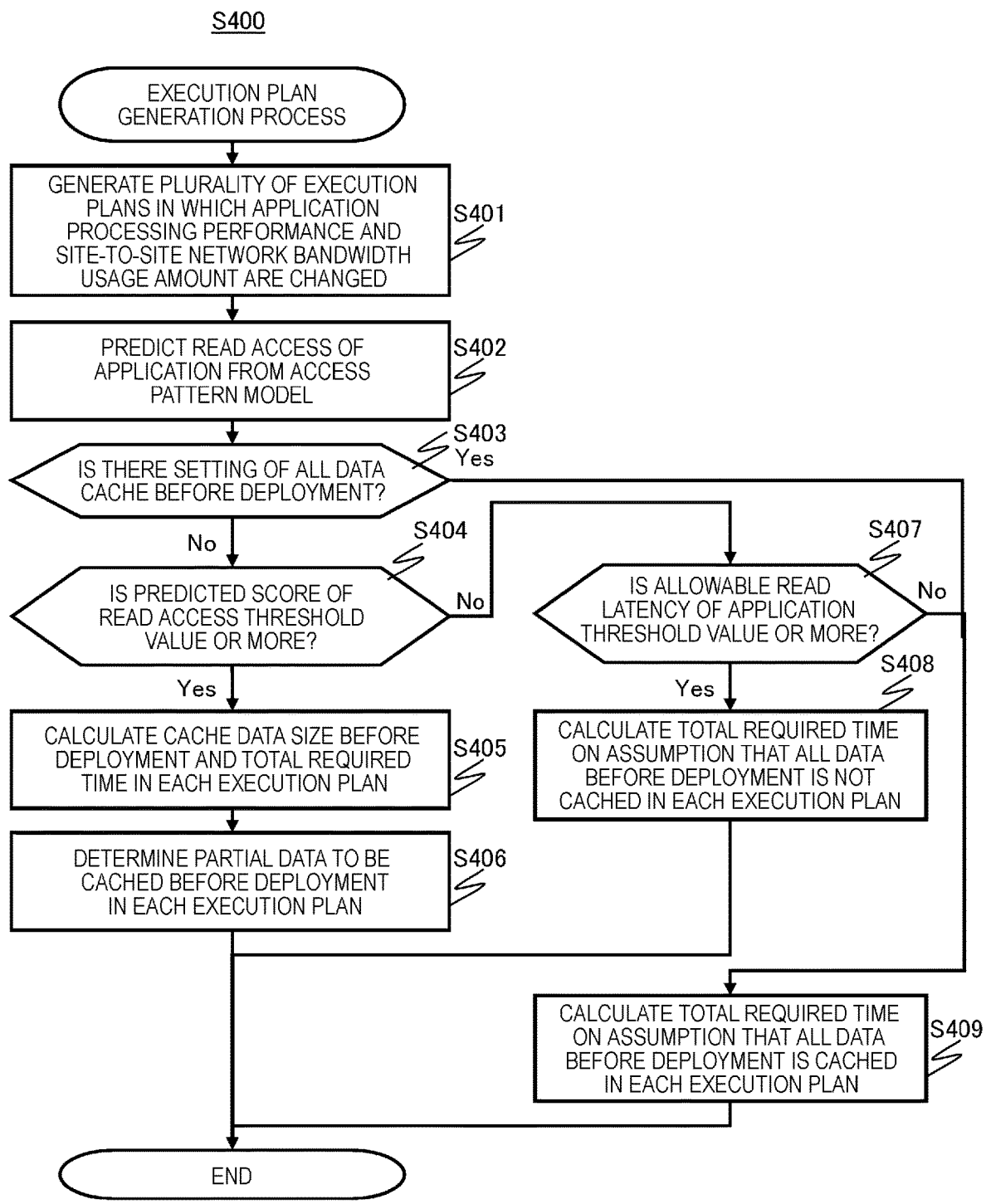
FIG. 17 is a flowchart showing an execution plan generation process according to the embodiment.

FIG. 17 is a flowchart showing the execution plan generation process according to the embodiment.

The QoS control program 120 generates a plurality of execution plans in which the application processing performance and the amount used of the site-to-site network bandwidth by the application (Step S401).

Next, the QoS control program 120 predicts the read access of the application by using the access pattern model 1200 corresponding to the application (Step S402).

Next, the QoS control program 120 determines whether the all data cache before the deployment is set to the application deployment request (Step S403). It is noted that when all data cache before deployment is set in the application execution request screen 1500, the setting is included in the application deployment request.

As a result, if all data cache before deployment is not set (Step S403: No), the QoS control program 120 determines whether the score of the predicted read access is a predetermined threshold value or more (Step S404).

As a result, if the score of the predicted read access is the predetermined threshold value or more (Step S404: Yes), the QoS control program 120 calculates the cache data size before the deployment in each execution plan and total required time relating to the application (the sum of the cache acquisition time and the application execution time) (Step S405). In addition, a method of calculating the cache data size before the deployment and the total required time (a pre-deployment cache data amount calculation method 1700: see FIG. 21) is described below.

Next, the QoS control program 120 determines the partial data to be cached before the deployment in each execution plan based on the predicted read access, generates the application execution plan table 1600 (Step S406), and ends the process. In addition, a method of determining partial data to be cached before the deployment (a pre-deployment cache part determination method 1800: see FIG. 22) is described below.

Meanwhile, if the score of the predicted read access is not the predetermined threshold value or more (Step S404: No), the score shows that credibility of the predicted read access is low, and thus the QoS control program 120 determines whether the allowable read latency of the application is the threshold value or more (Step S407).

As a result, if this allowable read latency of the application is the threshold value or more (Step S407: Yes), the QoS control program 120 calculates the total required time on the assumption that all data before the deployment in each execution plan is not cached, generates the application execution plan table 1600 (Step S408), and ends the process.

Meanwhile, if all data cache before the deployment is set (Step S403: Yes) or the allowable read latency of the application is not the threshold value or more (Step S407: No), the QoS control program 120 calculates the total required time on the assumption that all data before deployment is cached in each execution plan, generates the application execution plan table 1600 (Step S409), and ends the process.

Next, the application management table is described. FIG. 18 is a diagram illustrating the configuration of the application management table according to the embodiment.

The application management table 1400 is a table for managing information of the application that can be executed on the application execution platform 220, and stores the entry per application. The entry of the application management table 1400 includes fields of an ID 1401, a name 1402, and a description 1403.

Identification information (an APP ID) of the application corresponding to the entry is stored in the ID 1401. A name of the application corresponding to the entry is stored in the name 1402. Description of the application corresponding to the entry is stored in the description 1403.

Next, an application execution request screen 1500 is described.

Figure 19:
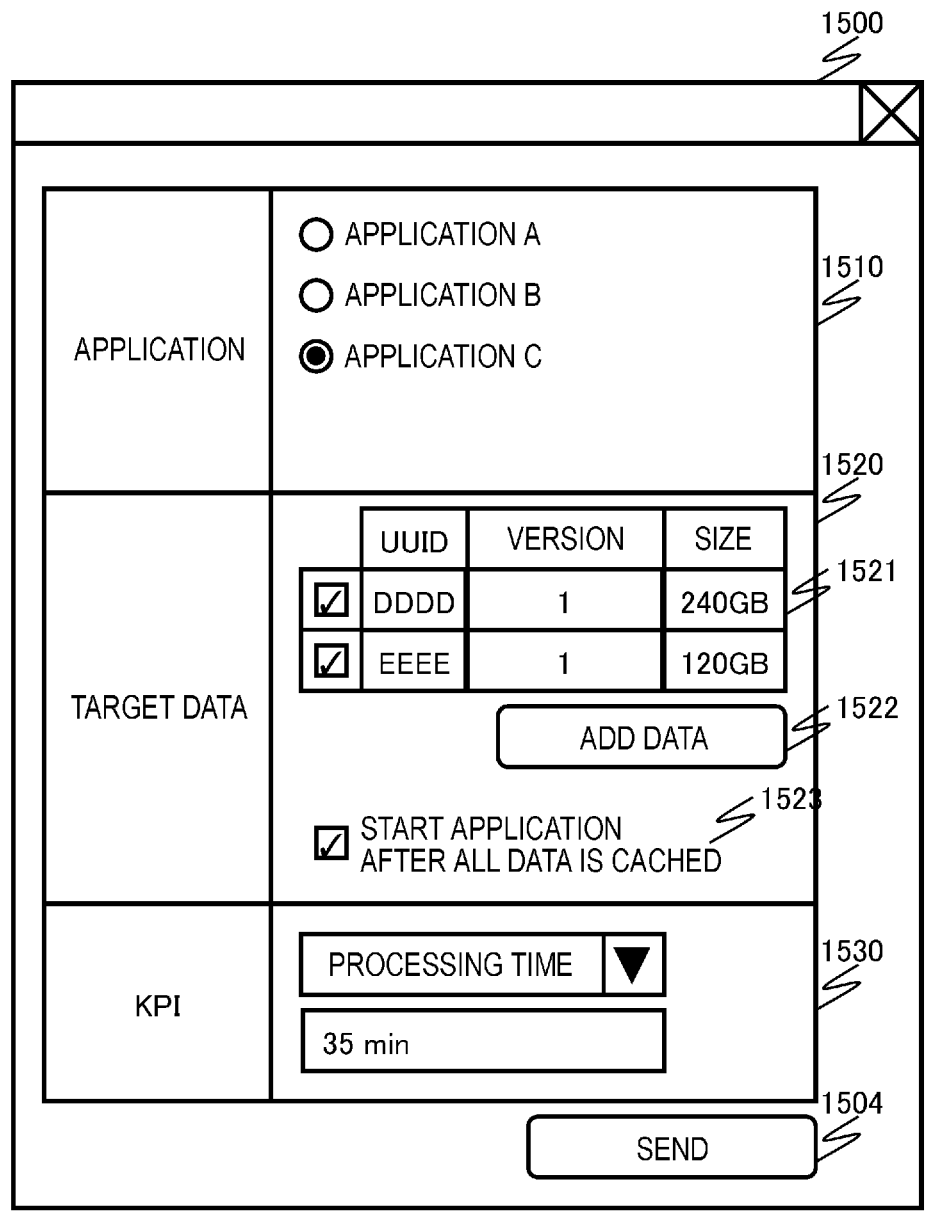
FIG. 19 is a diagram illustrating an example of an application execution request screen according to the embodiment.

FIG. 19 is a diagram illustrating an example of the application execution request screen according to the embodiment.

For example, the application execution request screen 1500 is generated based on information such as the application management table 1400 and the cross-site metadata search result 1300 by the management node 100 and displayed on the client node 400. The application execution request screen 1500 includes an application selection field 1510 for selecting the application to be used, a target data instruction field 1520 for inputting instruction to target data by the application, a KPI input field 1530 for inputting KPI, and a transmission button 1504.

At least one application among the applications registered in the application management table 1400 is displayed in the application selection field 1510 in a selectable manner. The user selects an application to be deployed and executed in the application selection field 1510.

The target data instruction field 1520 includes a target data selection field 1521 for selecting target data, an add button 1522 for instructing the addition of the target data, and an all data cache designation field 1523.

For example, at least one item of data in the data included in the cross-site metadata search result 1300 is displayed in the target data selection field 1521 in a selectable manner. The user selects data to be processed in the application in the target data selection field 1521.

The add button 1522 is a button for receiving the instruction of adding data displayed in the target data selection field 1521. When the add button 1522 is pressed, the client node 400 transmits the instruction of adding target data to the management node 100, and a screen (not illustrated) for selecting the target data is displayed via the management node 100.

Before the application is started, a check box for enabling the designation of the instruction of caching all data to be used is displayed in the all data cache designation field 1523. When this check box is designated, before the application is executed (before the deployment according to the present embodiment), all data that is not cached among target data used in the application is cached.

The KPI input field 1530 receives the selection of the type of the KPI to be used and an input of the value (an example of a target value) of the KPI. The selectable KPI may be, for example, processing time, processing cost, power consumption, response time, or a combination thereof.

The transmission button 1504 is a button for receiving the instruction of transmitting the information input to the application selection field 1510, the target data instruction field 1520, and the KPI input field 1530 to the management node 100. If the transmission button 1504 is pressed, the client program 420 transmits the application execution request based on the input information to the management node 100.

Next, an application execution plan table 1600 is described.

FIG. 20 is a diagram illustrating a configuration of an application execution plan table according to the embodiment.

The application execution plan table 1600 is a table for managing information estimated with respect to the generated execution plans and includes the entry per generated execution plan. The entry of the application execution plan table 1600 includes fields of an application processing performance 1601, a site-to-site network bandwidth 1602, total required time 1603, and KPI achievement possibility 1604.

The processing performance (for example, data processing speed) of the application set with respect to the execution plan corresponding to the entry is stored in the application processing performance 1601. The site-to-site network bandwidth (the network performance) set with respect to the execution plan corresponding to the entry is stored in the site-to-site network bandwidth 1602. The total required time relating to the execution of the application in the execution plan corresponding to the entry is stored in the total required time 1603. The information (possibility in the present embodiment) whether the designated KPI can be achieved with the execution plan corresponding to the entry is stored in the KPI achievement possibility 1604.

According to the present embodiment, for example, the execution plan corresponding to the entry in which the KPI achievement possibility 1604 is possible in the application execution plan table 1600 is presented to the user via the client node 400.

Next, a pre-deployment cache data amount calculation method 1700 is described.

Figure 21:
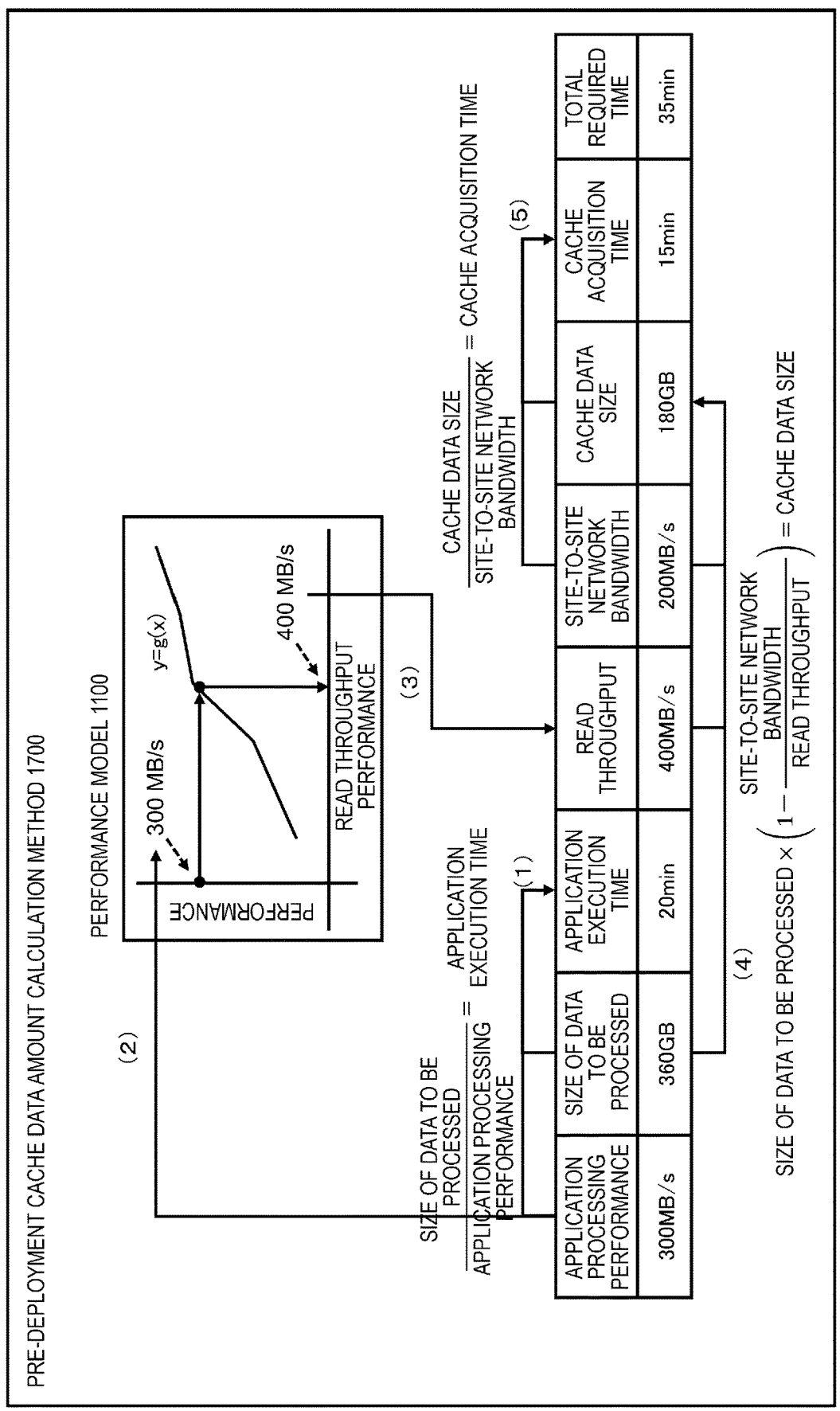
FIG. 21 is a diagram illustrating a pre-deployment cache data amount calculation method according to the embodiment.

FIG. 21 is diagram illustrating the pre-deployment cache data amount calculation method according to the embodiment.

Here, the data size (the processing target data size) of the data to be processed of the application is figured out, and the application processing performance and the site-to-site network bandwidth are set for the execution plan.

First, the QoS control program 120 calculates the application execution time by dividing the processing target data size by the application processing performance (FIG. 21(1)). In addition, the QoS control program 120 estimates the read throughput in the application (FIG. 21(3)) by using the application processing performance for the performance model 1100 (FIG. 21(2)).

Next, in order to execute the application without receiving the influence of the site-to-site network bandwidth, the QoS control program 120 calculates the necessary cache data size before deployment (before the execution of the application) (FIG. 21(4)) based on the processing target data size, the estimated read throughput, and the site-to-site network bandwidth. According to the present embodiment, the cache data size is calculated by the processing target data size× (1−the site-to-site network bandwidth/the read throughput).

Next, the QoS control program 120 calculates the cache acquisition time (FIG. 21(5)) by dividing the cache data size by the site-to-site network bandwidth, calculates the total required time relating to the application by adding the application execution time and the cache acquisition time. According to the pre-deployment cache data amount calculation method, the cache data size necessary when the execution plan is performed can be appropriately calculated.

Next, the pre-deployment cache part determination method is described.

FIG. 22 is a diagram illustrating the pre-deployment cache part determination method according to the embodiment. In FIG. 22, solid rectangles show parts that are cached before the deployment, and dotted rectangles show parts that are not cached before the deployment.

In Step S407 of the execution plan generation process, the cache parts are determined by any one of Methods 1 to 3, based on the access pattern estimated by the access pattern model 1200.

When the access pattern is sequential reading, and the order of files to be read cannot be estimated, cache parts are determined by Method 1. In Method 1, it is determined to cache the file from the head part of the file in an equal ratio with respect to each of all the files that are required to be read from the other sites of the application. For example, when there are File X and File Y as files to be read from the other sites, it is determined to cache File X and File Y in an equal ratio for the entire files from the head parts. According to this method, determination can be made so that the data of the file that is highly possibly accessed is appropriately cached.

When the access pattern is sequential reading, and the order of the files to be read can be estimated, the cache parts are determined by Method 2. In Method 2, the reading order of the files is estimated, and it is determined to cache files from the head parts of the files according to the order of the files. For example, when there are File X and File Y as files to be read from the other sites, determination is made so that the data is cached from the head part of File X when the files are read in the order of File X and File Y, and the determination is mad so that the data is cached from the head part of File Y in the next order when the data size of File X does not satisfy a necessary cache data size. In this method, the determination can be made so that the data of the files can be appropriately cached in a descending order of the possibility to be read with respect to the files that is highly possibly accessed.

When the access pattern is sequential reading, and the order of the parts of the files to be read can be estimated, the cache parts are determined by Method 3. In Method 3, the order of the parts of the files to be read is estimated, and determination is made so that the data of the parts is cached until each part reaches the cache data size according to the order. For example, when there are File X and File Y as files to be read from the other sites, determination is made so that the data is cached from (1) of File X when the reading is performed in the order of (1) of File X and (2) and (3) of File Y, and the parts of (2) and (3) of File Y in the next order are cached when the necessary cache data size is not satisfied. In this method, determination can be made so that caching can be appropriately performed in a descending order of the possibility to be read with respect to the files that are highly possibly accessed.

In Step S408 of the execution plan generation process, as illustrated in Method 4, determination is made so that a file read from the other site is not cached.

In Step S409 of the execution plan generation process, as illustrated in Method 5, determination is made so that data of all files read from the other sites are cached. For example, when there are File X and File Y as files to be read from the other sites, determination is made so that data of all of File X and File Y is cached.

Next, a stub generation process (S500) is described.

FIG. 23 is a flowchart showing the stub generation process according to the embodiment.

The stub generation process S500 is performed, for example, when the file and object virtualization program 321 receives the stub generation request from the management node 100.

First, the file and object virtualization program 321 generates the management information file 600 corresponding to the file instructed by the stub generation request in the own site and a stub file and adds the record (the entry) corresponding to the file to the metadata DB 700 (Step S501).

Next, the file and object virtualization program 321 updates the management information file 600 corresponding to the original file of the reference destination site of the stub file, that is, the site in which the original file corresponding to the stub file is stored (Step S502). At this point, the file and object virtualization program 321 of the reference destination site stores the site name of the site in which the stub file is generated in the field of the reference source site 616 of the management information file 600 of the original file.

Next, the file and object virtualization program 321 gives a response of the stub generation process to the management node 100 of the request source of the stub generation request (Step S503) and ends the process.

Next, a recall process (S600) is described.

FIG. 24 is a flowchart showing the recall process according to the embodiment.

The recall process S600 is performed, for example, when the file and object virtualization program 321 receives a recall request from the management node 100.

The file and object virtualization program 321 issues a data acquisition request for acquiring target data to the site including original of target data included in the recall request (Step S601). Meanwhile, the file and object virtualization program 321 of the site that receives the data acquisition request returns a response including the target data.

Next, the file and object virtualization program 321 receives the response to the data acquisition request (Step S602), reflects the target data included in the response to the file (Step S603), and changes the part state 653 of the corresponding part of the part management information 650 of the management information file 600 corresponding to the reflected file to the Cache (Step S604).

Next, the file and object virtualization program 321 determines whether the part state 653 of all parts of the part management information 650 of the management information file 600 corresponding to the file to which the data is reflected is the Cache (Step S605).

As a result, when the part state 653 of all parts of the part management information 650 is the Cache (Step S605: Yes), the state indicates that all parts of the file is cached. Therefore, the file and object virtualization program 321 changes the file state 704 of this file of the metadata DB 700 in the own site and the file state 614 of the management information file 600 to the Cache (Step S606) and causes the process to proceed to Step S607. When the part state 653 of all parts of the part management information 650 is not the Cache (Step S605: No), the process proceeds to Step S607.

In Step S607, the file and object virtualization program 321 responds the completion of the recall process to the request source of the recall request.

Next, the file and object virtualization program 321 determines whether to perform the look-ahead cache acquisition for looking ahead the other data of the files used in the application (Step S608). Here, whether to perform the look-ahead cache acquisition is determined, for example, according to the setting of the distributed file and object storage 320. In addition, in the application deployment process S300, when a post-deployment cache acquisition process S700 in the background is performed, the process herein is not performed.

Here, it is determined to perform the look-ahead cache acquisition (Step S608: Yes), the file and object virtualization program 321 causes the QoS control program 120 of the management node 100 to perform the post-deployment cache acquisition process S700 (see FIG. 25), and ends the process. When it is determined not to perform the look-ahead cache acquisition (Step S608: No), the process ends.

Next, the post-deployment cache acquisition process (S700) is described.

FIG. 25 is a flowchart showing the post-deployment cache acquisition process according to the embodiment.

The QoS control program 120 predicts the read access of the application by using the access pattern model 1200 corresponding to the application and determines the part (an additional cache part) to be acquired as the cache (Step S701). In addition, a method of determining the additional cache part (a post-deployment cache part determination method 1900: see FIG. 26) is described below.

Next, the QoS control program 120 transmits the recall request for acquiring the determined additional cache part to the file and object virtualization program 321 to perform the recall process (Step S702) for acquiring the determined additional cache part. Here, the recall process is, for example, processes from Steps S601 to S607 of Step S600.

Next, the QoS control program 120 determines whether a sufficient amount of cache is accumulated (Step S703). Here, for the accumulation of the sufficient amount of cache, it is determined whether an amount required for causing data necessary for the reading of the application not to be insufficient is cached or whether the caching of all necessary data is completed.

For example, when the cache is acquired in the background, that is, in the process of Step S700 in the application deployment process S300, whether all data of the necessary data is cached may be determined. In addition, for example, when the process of Step S700 is performed in the recall process S600 in a read process S800, for example, the cache data size (the additional cache data size) to be additionally acquired in association with the read data size of the application may be determined. For example, the additional cache data size may be the read data size of the application x (the site-to-site network bandwidth/the read throughput). According to the post-deployment cache acquisition process, after the application is executed, data to be highly possibly used subsequently can be appropriately cached.

Next, the post-deployment cache part determination method 1900 is described.

Figure 26:
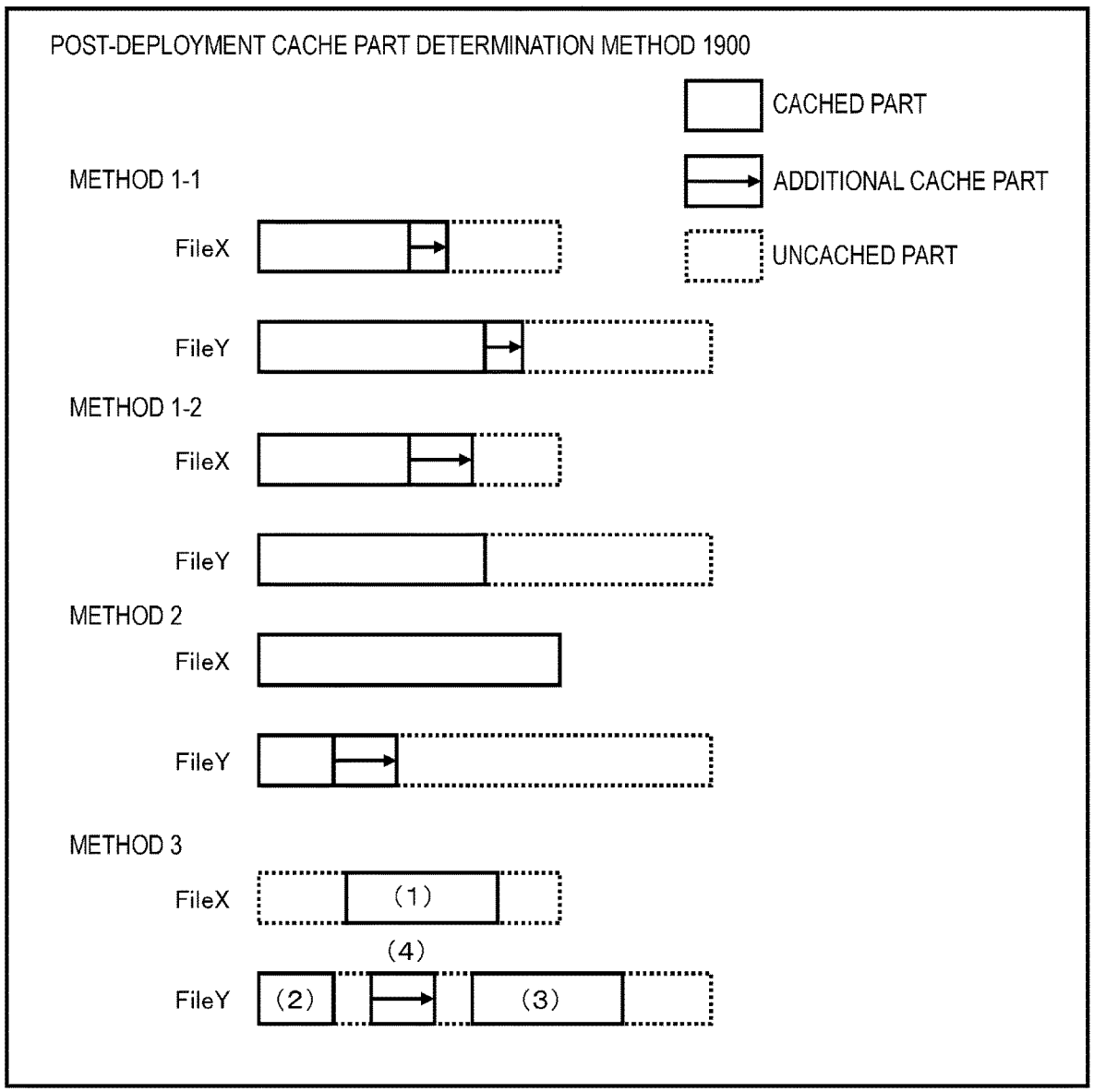
FIG. 26 is a diagram illustrating a post-deployment cache part determination method according to the embodiment.

FIG. 26 is a diagram illustrating the post-deployment cache part determination method according to the embodiment. In FIG. 26, solid rectangles indicate cached parts that are already cached, dotted rectangles indicate un-cached parts that are not yet cached, and rectangles each including a solid arrow indicate the additional cache part to be cached next.

In Step S701 of the post-deployment cache acquisition process, additional cache parts are determined by any one of Methods 1-1, 1-2, 2, and 3 based on the access pattern estimated by the access pattern model 1200.

When the access pattern is sequential reading, and the order of the files to be read cannot be estimated, the additional cache parts are determined by Method 1-1 or 1-2. In Method 1-1, determination is made so that the data is cached after the cached part of the file in the equal ratio to all files that are required to be read from the other sites. For example, when there are File X and File Y as the files to be read from the other sites, determination is made so that File X and File Y are cached in the equal ratio to the entire files immediately after the cached part. In Method 1-2, when there is actually an access to the files, it is determined that the data is cached after the cached parts of the actually accessed files. For example, when there are File X and File Y as the files read from the other sites, and there is an access to File X actually, it is determined that the data is cached immediately after cached parts of File X. In this method, data to be highly possibly used can be appropriately cached.

When the access pattern is sequential reading, and an order of files to be read can be estimated, a cache part is determined by Method 2. In Method 2, it is determined that the order of files to be read is estimated, and the data is cached after the cached part of the file according to the order of the files. For example, when there are File X and File Y as the file to be read from the other sites, and reading is performed in the order of File X and File Y, it is determined that the data is cached after the cached part of File Y of the next order when File X is completely cached. According to this method, data to be highly possibly used can be appropriately cached.

When the access pattern is sequential reading in the predetermined range, and the order of the parts of the file to be read can be estimated, the cache part is determined by Method 3. In Method 3, the order of the parts of the files to be read is estimated, and determination is made so that the data is cached after the cached parts according to the order thereof. For example, when there are File X and File Y as the files to be read from the other sites, and reading is performed in the order of (1) of File X, (2), (3), and (4) of File Y, if the data is cached up to (3) of File Y, determination is made so that the data is cached from the part of (4) of File Y in the next order. According to this method, the part of the data to be highly possibly used can be appropriately cached.

Next, the read process (S800) is described.

FIG. 27 is a flowchart showing the read process according to the embodiment.

The read process is performed when the file and object virtualization program 321 receives the read request from the executed application 221 that is deployed in the application execution platform 220. Here, information that can specify the part of the file to be read is included in the read request.

The file and object virtualization program 321 refers to the management information file 600 corresponding to a file (target file) as a target of the read request and determines whether the part state 653 of the part as a target of reading the target file is Stub (Step S801).

As a result, when the part state of the target part is not Stub (Step S801: No), the part state means that the data of the target part of the target file is already present in the own site, the file and object virtualization program 321 causes the process to proceed to Step S803.

Meanwhile, when the part state of the target part is Stub (Step S801: Yes), the file and object virtualization program 321 performs the recall process for acquiring the determined target part (Step S802) and causes the process to proceed to Step S803. Here, the recall process may be, for example, the same process as Step S600.

Next, the file and object virtualization program 321 adds the entry of the read request to the operation log 800 of this application (Step S803), reads the data of the target part from the user file, and responds to the application (Step S804).

According to this read process, it is possible to quickly respond to the application with the data of the target part without performing the recall process on the already cached data.

In addition, the present invention is not limited to the above embodiment, and can be appropriately changed without departing from the gist of the present invention.

For example, in the above embodiment, the network bandwidth is managed as the information of the site-to-site network, but the present invention is not limited to this, and for example, jitters between sites or latency may be managed and used.

In addition, according to the embodiment, in the application model management table 1000, one performance model per IC operation is managed, but, for example, the performance model may be managed according to the type of data to be accessed such as databases, files, or blocks, the performance model may be managed according to an image file, a video file, a voice file, or the like, and the performance model may be managed for each combination of a file (for example, a setting file) designated for the first time and a file (for example, an analysis target file) designated for the second time.

In addition, according to the above embodiment, in the site system 20, the distributed file and object storage 320 that manages files or objects distributed is configured with the plurality of storage nodes 300, but the present invention is not limited thereto, and instead of the distributed file and object storage 320, a distribution file system for distributing and managing files may be configured, a distribution object system for distributing and managing objects may be configured, a file storage or an object storage that does not perform distribution or management may be configured, and a block storage that manages data per block unit may be configured.

In addition, according to the above embodiment, an example of executing an application by using the compute node 200 and the storage node 300 in the same site of the client node 400 is provided, but the present invention is not limited thereto. For example, the application may be executed by a compute node and a storage node of a public cloud at a location different from that of the client node 400. In such a configuration, time until a process after the application is deployed ends can be suppressed by caching the data before the application is deployed, and thus the billing amount when billing is performed due to the deployment in the public cloud can be suppressed.

In addition, according to the above embodiment, in the application deployment process, subsequent processes are performed by receiving the selection of the application execution plan to be executed by the user. However, the present invention is not limited thereto, and for example, the application execution plan that satisfies the KPI may be executed regardless of the selection of the user.

In addition, according to the embodiment, the data is cached before the application is deployed, but the present invention is not limited thereto. The data may be cached before the process of the application actually starts, though the application is deployed.

In addition, according to the above embodiment, a part or all of the processes executed by the CPU may be executed by a dedicated hardware circuit. In addition, the program according to the embodiment may be installed from a program source. The program source may be a program distribution server or recording media (for example, a portable recording media).

What is claimed is:

1. A data control device that manages a storage device that accessibly manages a data unit that is used in an application,
wherein the storage device is accessible to a data unit that is managed by a storage device of another site different from an own site,
wherein the data control device includes a processor,
wherein the processor specifies an access circumstance relating to the data unit by the application, and controls caching by the storage device of the own site with respect to the data unit managed by the storage device of the other site used by the application, before the application is executed, based on the access circumstance,
wherein the access circumstance includes an access performance to the data unit by the application,
wherein the processor determines a cache size that is a size of data of the data unit to be cached before the application is executed, based on the access performance, and controls the storage device of the own site so that the data of the determined cache size is cached,
wherein the data control device includes a performance model that can specify an access performance that can realizes a processing performance of the application, and
wherein the processor receives a target value as a target relating to the processing performance to the application and specifies the access performance satisfying the target value based on the performance model.

2. The data control device according to claim 1,
wherein the processor measures the access performance when the processing performance of the application is changed and actually executed, and generates the performance model based on a result of the measurement.

3. The data control device according to claim 1,
wherein the processor determines the cache size based on the access performance and a network performance between the storage device of the own site and the storage device of the other site.

4. The data control device according to claim 1,
wherein the access circumstance includes an access pattern to the data unit by the application, and
wherein the processor controls a part to be cached among data of the data unit based on the access pattern.

5. The data control device according to claim 1,
wherein, after the application is executed, the processor controls the storage device of the own site so that data that is not read to the storage device of the own site among data of the data unit to be used in the application is further read.

6. A data control device that manages a storage device that accessibly manages a data unit that is used in an application,
wherein the storage device is accessible to a data unit that is managed by a storage device of another site different from an own site,
wherein the data control device includes a processor,
wherein the processor specifies an access circumstance relating to the data unit by the application, and controls caching by the storage device of the own site with respect to the data unit managed by the storage device of the other site used by the application, before the application is executed, based on the access circumstance
wherein the access circumstance includes an access pattern to the data unit by the application,
wherein the processor controls a part to be cached among data of the data unit based on the access pattern,
wherein the data control device includes an access pattern model that can estimate the access pattern by the application, and
wherein the processor specifies an access pattern by the application based on the access pattern model.

7. The data control device according to claim 6,
wherein, when a reading order of the application is input, the access pattern model outputs access part information indicating a part of the data unit to be accessed in the reading order, and
wherein the processor controls a part to be cached among data of the data unit based on the access part information.

8. The data control device according to claim 7,
wherein the processor generates the access pattern model by performing machine learning with an access log when the application is executed.

9. The data control device according to claim 7,
wherein the access pattern model further outputs a score indicating a certainty of the access part information, and
wherein the processor controls the data units so that data of the predetermined cache size is cached when the score is a predetermined value or more, and controls the data units so that all the data units are not cached or all the data of the data units is cached when the score is not a predetermined value or more.

10. A data control device that manages a storage device that accessibly manages a data unit that is used in an application,
    wherein the storage device is accessible to a data unit that is managed by a storage device of another site different from an own site,
    wherein the data control device includes a processor,
    wherein the processor specifies an access circumstance relating to the data unit by the application, and controls caching by the storage device of the own site with respect to the data unit managed by the storage device of the other site used by the application, before the application is executed, based on the access circumstance,
    wherein the application is deployed to a predetermined computing device and executed, and
    wherein the processor causes the storage device of the own site to cache the data unit managed by the storage device of the other site which is used by the application, before the application is deployed in the computing device.

11. A data control method performed by a data control device that manages a storage device that accessibly manages a data unit used by an application,
    wherein the storage device is accessible to a data unit that is managed by a storage device in another site different from an own site, and
    wherein the data control device specifies an access circumstance relating to the data unit by the application, and controls caching by the storage device of the own site with respect to the data unit managed by the storage device of the other site used by the application, before the application is executed, based on the access circumstance,
    wherein the application is deployed to a predetermined computing device and executed, and
    wherein the processor causes the storage device of the own site to cache the data unit managed by the storage device of the other site which is used by the application, before the application is deployed in the computing device.

\* \* \* \* \*